US010761539B2

(12) United States Patent
Moore et al.

(10) Patent No.: US 10,761,539 B2
(45) Date of Patent: Sep. 1, 2020

(54) ROBOT CHARGER DOCKING CONTROL

(71) Applicant: Locus Robotics Corp., Wilmington, MA (US)

(72) Inventors: Thomas Moore, Edinburgh (GB); Bradley Powers, Lowell, MA (US); Hian Kai Kwa, Reading, MA (US)

( * ) Notice: Subject to any disclaimer, the term of this patent is extended or adjusted under 35 U.S.C. 154(b) by 11 days.

(21) Appl. No.: 15/821,650

(22) Filed: Nov. 22, 2017

(65) Prior Publication Data
US 2019/0155295 A1  May 23, 2019

(51) Int. Cl.
*G05D 1/02* (2020.01)
*B60L 53/35* (2019.01)

(52) U.S. Cl.
CPC ............ *G05D 1/0225* (2013.01); *B60L 53/35* (2019.02); *G05D 1/0236* (2013.01); *G05D 2201/0216* (2013.01)

(58) Field of Classification Search
CPC .......... G05D 1/0225; G05D 2201/0216; B60L 11/1827
See application file for complete search history.

(56) References Cited

U.S. PATENT DOCUMENTS

| 5,006,988 | A | 4/1991 | Borenstein et al. |
| 8,060,254 | B2 | 11/2011 | Myeong et al. |
| 8,060,306 | B2 | 11/2011 | Puhalla et al. |
| 8,209,144 | B1 | 6/2012 | Anguelov et al. |
| 8,723,872 | B2 | 5/2014 | Beardsley et al. |
| 8,793,069 | B2 | 7/2014 | Kuroda |
| 9,067,320 | B2 | 6/2015 | Beardsley et al. |
| 9,082,233 | B2 | 7/2015 | Beardsley et al. |
| 9,145,286 | B2 | 9/2015 | Pfaff et al. |
| 9,216,745 | B2 | 12/2015 | Beardsley et al. |
| 9,286,810 | B2 | 3/2016 | Eade et al. |
| 9,412,173 | B2 | 8/2016 | Leonard et al. |

(Continued)

FOREIGN PATENT DOCUMENTS

| EP | 2806325 A2 | 11/2014 |
| EP | 3185096 A1 | 6/2017 |

OTHER PUBLICATIONS

Hu et al., A modular computing architecture for autonomous robots, 1998, Microprocessors and Microsystems, 349-361. (Year: 1998).*

(Continued)

*Primary Examiner* — Aaron L Troost
(74) *Attorney, Agent, or Firm* — Verrill; John W. Powell

(57) ABSTRACT

A method and system for docking a robot with a charger docking station, including receiving an initial pose and receiving a mating pose associated with the robot charger docking station, performing a first navigation from a location to the initial pose, and performing a second navigation of the robot from the initial pose to the mating pose. The second navigation may proceed substantially along an arc path from the initial pose to the mating pose, thereby, upon arriving at the mating pose, an electrical charging port of the robot mates with an electrical charging assembly. The arc path may be associated with a section of a unique circle having a radius and a center equidistant from the initial pose and the mating pose. Controlling for error may include a proportional control and/or weighted control or switching between the controls to maintain an error below a threshold.

9 Claims, 34 Drawing Sheets

(56) References Cited

U.S. PATENT DOCUMENTS

| | | | |
|---|---|---|---|
| 9,592,609 B2 | 3/2017 | LaFary et al. | |
| 2007/0016328 A1* | 1/2007 | Ziegler | A47L 5/14 |
| | | | 700/245 |
| 2011/0004342 A1* | 1/2011 | Knopow | A47L 5/28 |
| | | | 700/253 |
| 2011/0082585 A1 | 4/2011 | Sofman et al. | |
| 2011/0137461 A1 | 6/2011 | Kong et al. | |
| 2014/0100693 A1 | 4/2014 | Fong et al. | |
| 2016/0363454 A1 | 12/2016 | Hatanaka et al. | |
| 2017/0105592 A1* | 4/2017 | Fong | A47L 9/2894 |
| 2017/0285648 A1 | 10/2017 | Welty | |

OTHER PUBLICATIONS

Neal, Math 117 Angular Velocity vs. Linear Velocity, https://people.wku.edu/david.neal/117/Unit2/AngVel.pdf, 2010. (Year: 2010).*

D. Fox, W. Burgard, and S. Thrun, "The Dynamic Window Approach to Collision Avoidance," in Robotics & Automation Magazine, IEEE, vol. 4, No. 1. (Mar. 1997), pp. 23-33.

Berthold K. P. Horn, "Closed-form solution of absolute orientation using unit quaternions," Journal of the Optical Society of America, 4(4), Apr. 1987, pp. 629-642.

Jur van den Berg, Stephen J. Guy, Ming Lin, and Dinesh Manocha. "Reciprocal n-body collision avoidance", in Robotics Research: The 14th International Symposium ISRR, Cédric Pradalier, Roland Siegwart, and Gerhard Hirzinger (eds.), Springer Tracts in Advanced Robotics, vol. 70, Springer-Verlag, May 2011, pp. 3-19.

Frese, Udo & Wagner, René & Röfer, Thomas. (2010). A SLAM overview from a users perspective. KI. 24. 191-198. 10.1007/s13218-010-0040-4.

Edwin Olson, "M3RSM: Many-to-many multi-resolution scan matching", Proceedings of the IEEE International Conference on Robotics and Automation (ICRA), Jun. 2015.

Edwin B. Olson, "Robust and Efficient Robotic Mapping", PhD Dissertation, Carnegie-Mellon University, 2008.

Sebastian Thrun, "Robotic Mapping: A Survey", Carnegie-Mellon University, CMU-CS-02-111, Feb. 2002.

Edwin B. Olson, "Real-Time Correlative Scan Matching", in Proceedings of the 2009 IEEE international Conference on Robotics and Automation (ICRA'09), IEEE Press, Piscataway, NJ, USA, 2009, pp. 1233-1239.

International Search Report and Written Opinion, dated Feb. 19, 2019, received in international patent application No. PCT/US2018/061567, 11 pages.

International Search Report and Written Opinion, dated Feb. 12, 2019, received in international patent application No. PCT/US2018/061560, 11 pages.

Vaz P M et al: "Dockig of a mobile platform based on infrared sensors", Industrial Electronics, 1997, ISIE '97., Proceedings of the IEEE Inter National Symposium on Guimaraes, Portugal July 7-11, 1997, New York, NY, USA, IEEE, US, vol. 2, July 7, 1997 (July 7, 1997).

Huosheng H et al: "A modular computing architecture for autonomous robots", Microprocessors and Microsystems, IPC Business Press Ltd. London, GB, vol. 21, No. 6, Mar. 1, 1998.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| | Location | Fiducial ID |
|---|---|---|
| 400 | | ← 404 |
| 402a → | L01001A | 11 |
| 402b → | L01001B | 11 |
| 402c → | L01001C | 11 |
| 402d → | L01001D | 11 |
| 402e → | L01001E | 11 |
| 402f → | L01001F | 11 |
| | L01002A | 12 |
| | L01002B | 12 |
| | L01002C | 12 |
| | L01002D | 12 |
| | L01002E | 12 |
| | L01003A | 13 |
| | L01003B | 13 |
| | L01003C | 13 |
| | L01003D | 13 |
| | L01003E | 13 |
| | L01003F | 13 |
| | L01004A | 14 |
| | L01004B | 14 |
| | L01004C | 14 |
| | L01004D | 14 |
| | L01004E | 14 |
| | L01005A | 15 |
| | L01005B | 15 |
| | L01005C | 15 |
| | L01005D | 15 |
| | L01005E | 15 |
| | L01005F | 15 |

FIG. 7

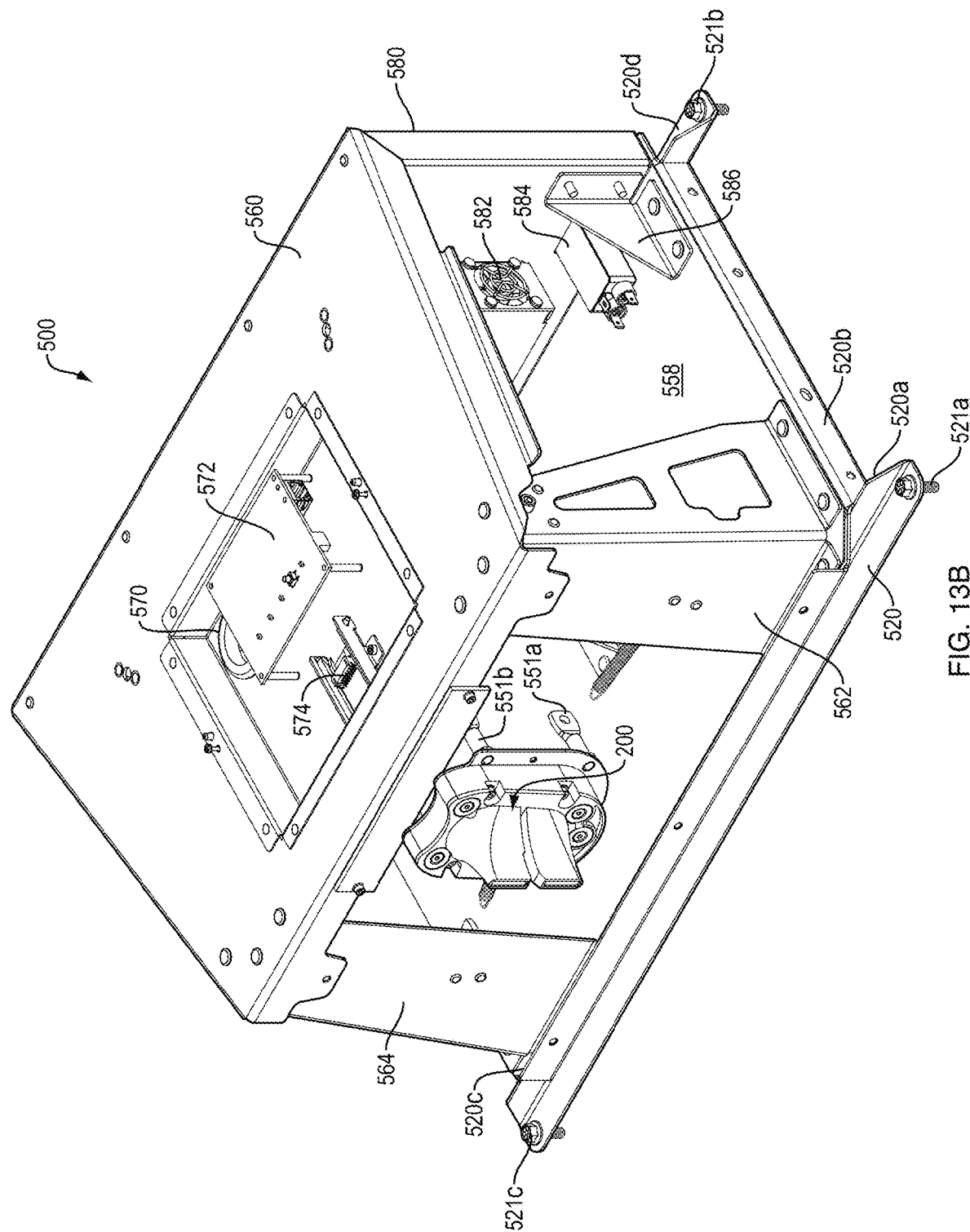

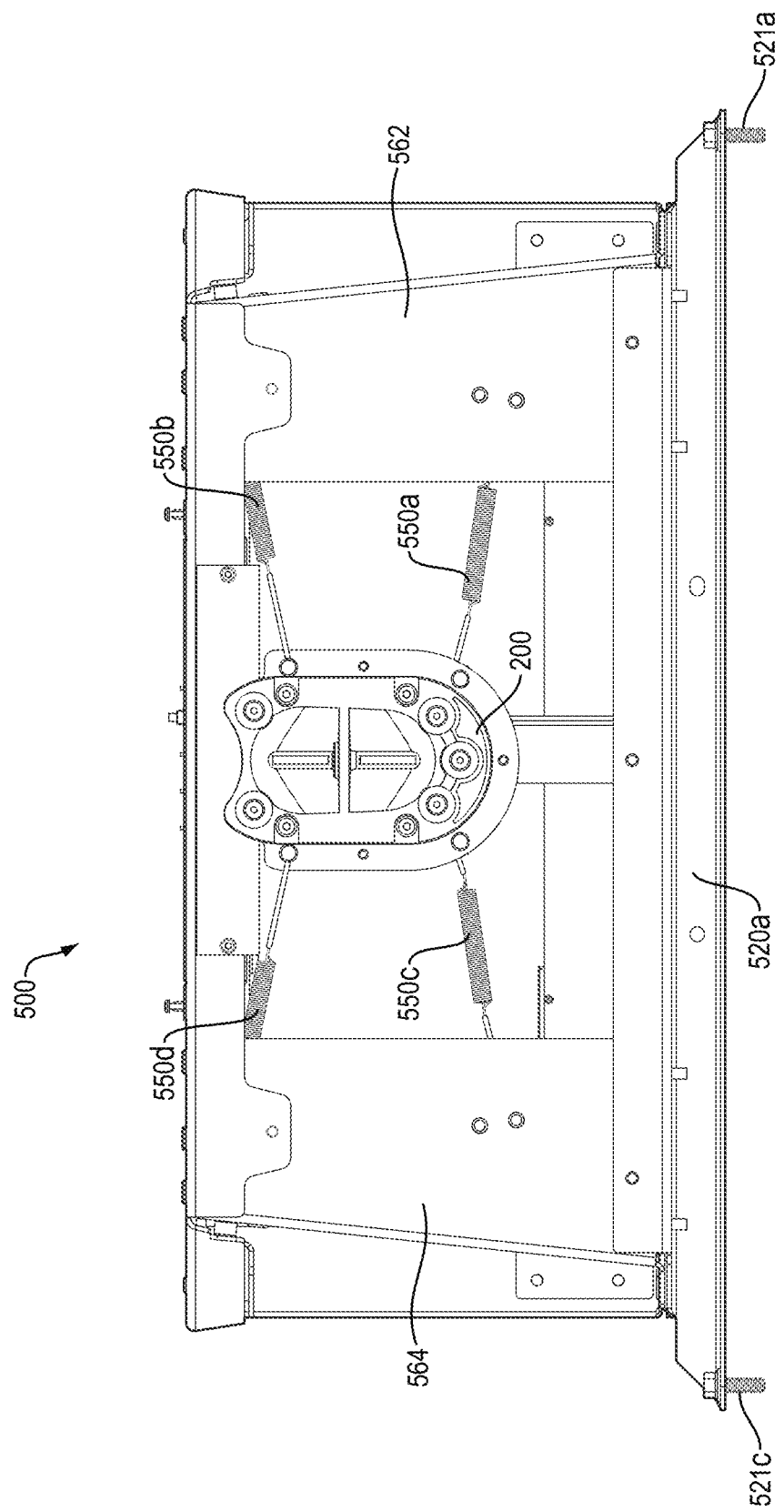

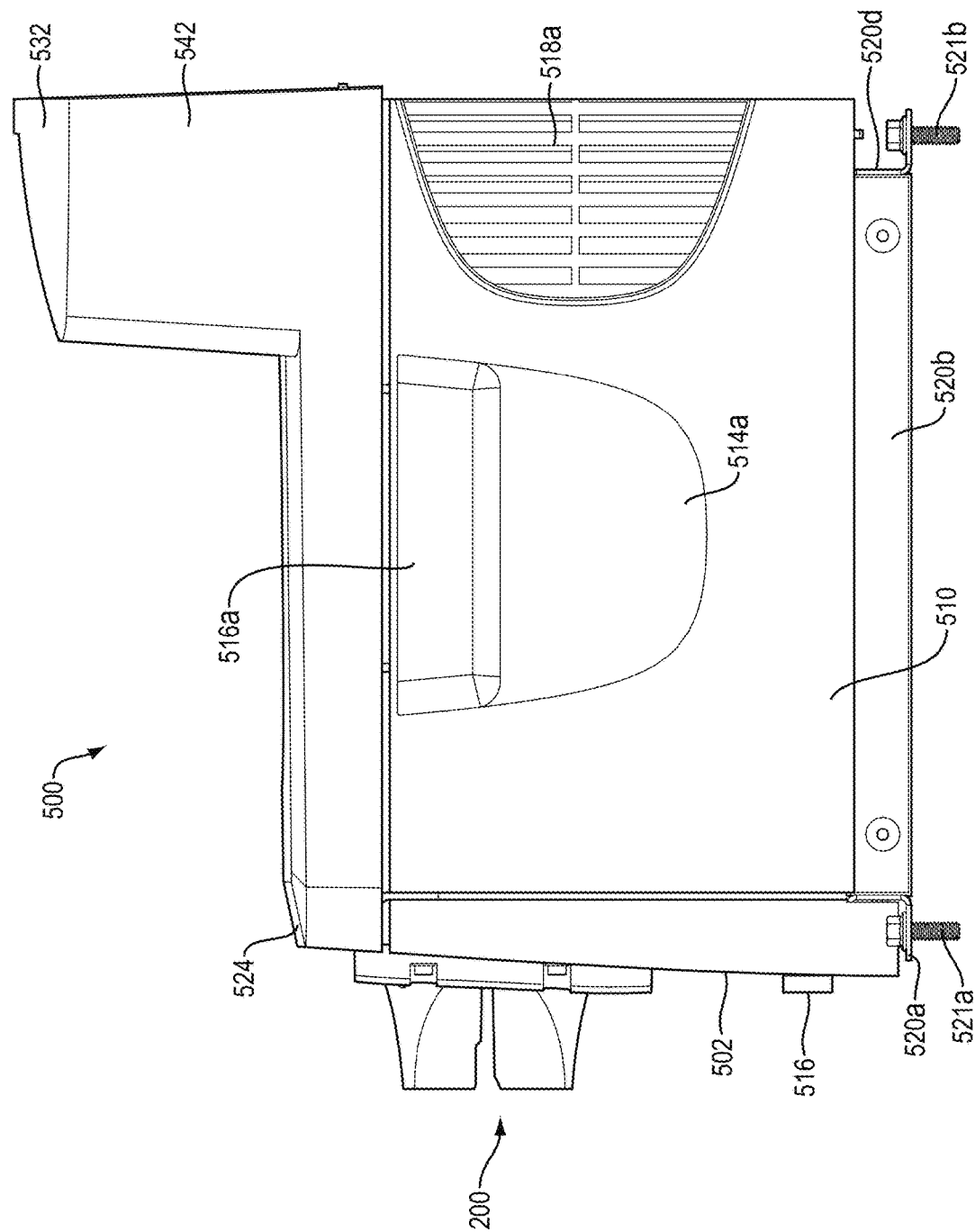

ROBOT CHARGER DOCKING CONTROL

CROSS-REFERENCE TO RELATED APPLICATIONS

This application is related to pending U.S. application Ser. No. 15/712,491, filed Sep. 22, 2017, entitled "AUTONOMOUS ROBOT CHARGING STATION", which is incorporated herein by reference.

This application is related to co-filed U.S. application Ser. No. 15/821,669 filed Sep. 22, 2017, entitled "ROBOT CHARGER DOCKING LOCALIZATION", which is incorporated herein by reference.

FIELD OF THE INVENTION

The invention described herein relates to an electrical charging system and more particularly to the navigation of a robot to an electrical charging system and the docking of the robot to the electrical charging system.

BACKGROUND OF THE INVENTION

In many applications, robots are used to perform functions in place of humans or to assist humans in order to increase productivity and efficiency. One such application is order fulfillment, which is typically performed in a large warehouse filled with products to be shipped to customers who have placed their orders over the internet for home delivery. Fulfilling such orders in a timely, accurate and efficient manner is logistically challenging to say the least.

In an online Internet shopping application, for example, clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address.

An important goal of the order fulfillment process is thus to ship as many items in as short a time as possible. The process of receiving an order, planning its fulfillment, finding the storage shelf or bin, picking the product, and repeating the process for each item on the order, then delivering the order to a shipping station is repetitive and labor intensive. In a warehouse stocked with thousands or tens of thousands of items of rapidly turning inventory, robots play a critical role in ensuring timely and efficient order fulfillment. In addition, the products that will ultimately be shipped first need to be received in the warehouse and stored or "placed" in storage bins in an orderly fashion throughout the warehouse so they can be readily retrieved for shipping.

Using robots to perform picking and placing functions may be done by the robot alone or with the assistance of human operators. Picking and placing or stocking functions, whether or not performed with human interaction, requires that the robot navigate from its present location to a target product storage or "bin" location. One method of navigation by a robot in an order fulfilment warehouse employs a spatial model or "map" of the warehouse, locally stored and updated by the robot, to allow the robot to operate autonomously or semi-autonomously as it performs its assigned order fulfillment tasks. The map is a digital representation of the warehouse, its storage locations, obstacles and other features. To arrive at a product bin in the presence of stationary and dynamic obstacles, the robot performs processing operations on the map to determine its present location and for continually recalibrating its movement along the goal path.

The robots are powered by electricity, which is stored in batteries onboard the robot. With all of the travelling that the robots do around the warehouse they must be regularly recharged. Therefore, for the operation to run smoothly, an efficient and effective way to charge the robots is a requirement. For general navigation within a warehouse, the size and resolution of the map may be such that a robot can successfully navigate to its target location, while avoiding obstacles along its goal path. Processing on the warehouse map, however, may require too much processing and result in too coarse of a localization and control where more precise localization and control is needed, such as when docking the robot to a robot charging station.

What is needed is a computationally efficient approach to localizing and controlling the robot during the docking of a robot to a robot charging station.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect of the invention, there is a method for navigating a robot for docking with a charger docking station. The method may be include receiving an initial pose associated with a robot charger docking station, receiving a mating pose associated with the robot charger docking station, performing a first navigation of a robot from a current pose to the initial pose, and performing a second navigation of the robot from the initial pose to the mating pose. The second navigation of the robot may proceed substantially along an arc path from the initial pose to the mating pose, thereby, upon arriving at the mating pose, an electrical charging port of the robot mates with an electrical charging assembly of the charger docking station.

In one embodiment of the first aspect, the arc path from the initial pose to the mating pose may be associated with a section of a unique circle having a radius and a center equidistant from a first location associated with the initial pose and a second location associated with the mating pose. In some embodiments, an instantaneous linear velocity and an instantaneous angular velocity of the robot at a pose along the arc path are maintained in substantially constant relation with the radius. Controlling a rotational error of the robot using such relation may include issuing a proportional control and/or a weighted control. In further embodiments, weighting parameters of the weighted control may be adjusted in nonlinear relation as a function of the distance to the charging station.

In the above embodiments, a method of controlling the error of the robot along the arc path may include closing the rotational error with a proportional control until the error gets below a threshold, setting a linear velocity to a fixed value, controlling the robot according to a weighted control, constantly updating a radius and rotational error, and when a threshold is exceeded, switching the control from the weighted control to the proportional control until the error returns to below the threshold.

In a second aspect of the invention, there is a mobile robot configured to navigate from a current location to and dock with a charger docking station for re-charging. The mobile robot may include a wheeled mobile base having an electrical charging port and a processor. The processor of the wheeled mobile base may be configured to obtain an initial pose associated with the charger docking station, obtain a mating pose associated with the charger docking station, navigate the wheeled mobile base from the current location to the initial pose, and navigate the wheeled mobile base from the initial pose to the mating pose. In some embodiments, the wheeled mobile base may proceed substantially along an arc path from the initial pose to the mating pose, thereby causing the electrical charging port of the wheeled base to mate with an electrical charging assembly of the robot charger station.

In an embodiment of the second aspect, the arc path from the initial pose to the mating pose may be associated with a section of a unique circle having a radius and a center equidistant from a first location associated with the initial pose and a second location associated with the mating pose. In some embodiments, an instantaneous linear velocity and an instantaneous angular velocity of the robot at a pose along the arc path are maintained in substantially constant relation with radius. Controlling a rotational error of the robot using such relation may include issuing a proportional control and/or a weighted control. In further embodiments, weighting parameters of the weighted control may be adjusted in nonlinear relation as a function of the distance to the charging station.

In the above embodiments, controlling the error of the robot along the arc path may include closing the rotational error with a proportional control until the error gets below a threshold, setting a linear velocity to a fixed value, controlling the robot according to a weighted control, constantly updating a radius and a rotational error, and when a threshold is exceeded, switching the control from the weighted control to the proportional control until the error returns to below the threshold.

In a third aspect, there is a robot system including a transceiver, a data processor and a data storage device having instructions stored thereon for execution by the data processor. The instructions for execution by the processor may be configured to receive an initial pose associated with a robot charger docking station, receive a mating pose associated with the robot charger docking station, perform a first navigation of a robot from a current pose to the initial pose, and perform a second navigation of the robot from the initial pose to the mating pose. In some embodiments, the second navigation may proceed substantially along an arc path from the initial pose to the mating pose, thereby causing the electrical charging port of the wheeled base to mate with an electrical charging assembly of the robot charger station.

In an embodiment of the third aspect, the arc path from the initial pose to the mating pose may be associated with a section of a unique circle having a radius and a center equidistant from a first location associated with the initial pose and a second location associated with the mating pose. In some embodiments, an instantaneous linear velocity and an instantaneous angular velocity of the robot, at a pose along the arc path, are maintained in substantially constant relation with the radius. Controlling a rotational error of the robot using such relation may include issuing a proportional control and/or a weighted control.

In further embodiments, the weighting parameters of the weighted control may be adjusted in nonlinear relation as a function of the distance to the charging station. In the above embodiments, controlling the error of the robot along the arc path may include closing the rotational error with a proportional control until the error gets below a threshold, setting a linear velocity to a fixed value, controlling the robot according to a weighted control, constantly updating a radius and a rotational error, and when a threshold is exceeded, switching the control from the weighted control to the proportional control until the error returns to below the threshold.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 6 is a table of the fiducial identification to pose mapping;

FIG. 7 is a table of the bin location to fiducial identification mapping;

FIG. 13B is a perspective view of the charger docking station of FIG. 14A with the exterior cover removed depicting the interior of the charger docking station;

FIG. 14B is the front view of the charger docking station of FIG. 14A with the exterior cover removed depicting the interior of the charger docking station;

FIG. 15A is a left side view of the charger docking station of FIG. 13A;

DETAILED DESCRIPTION OF THE INVENTION

Figure 1:
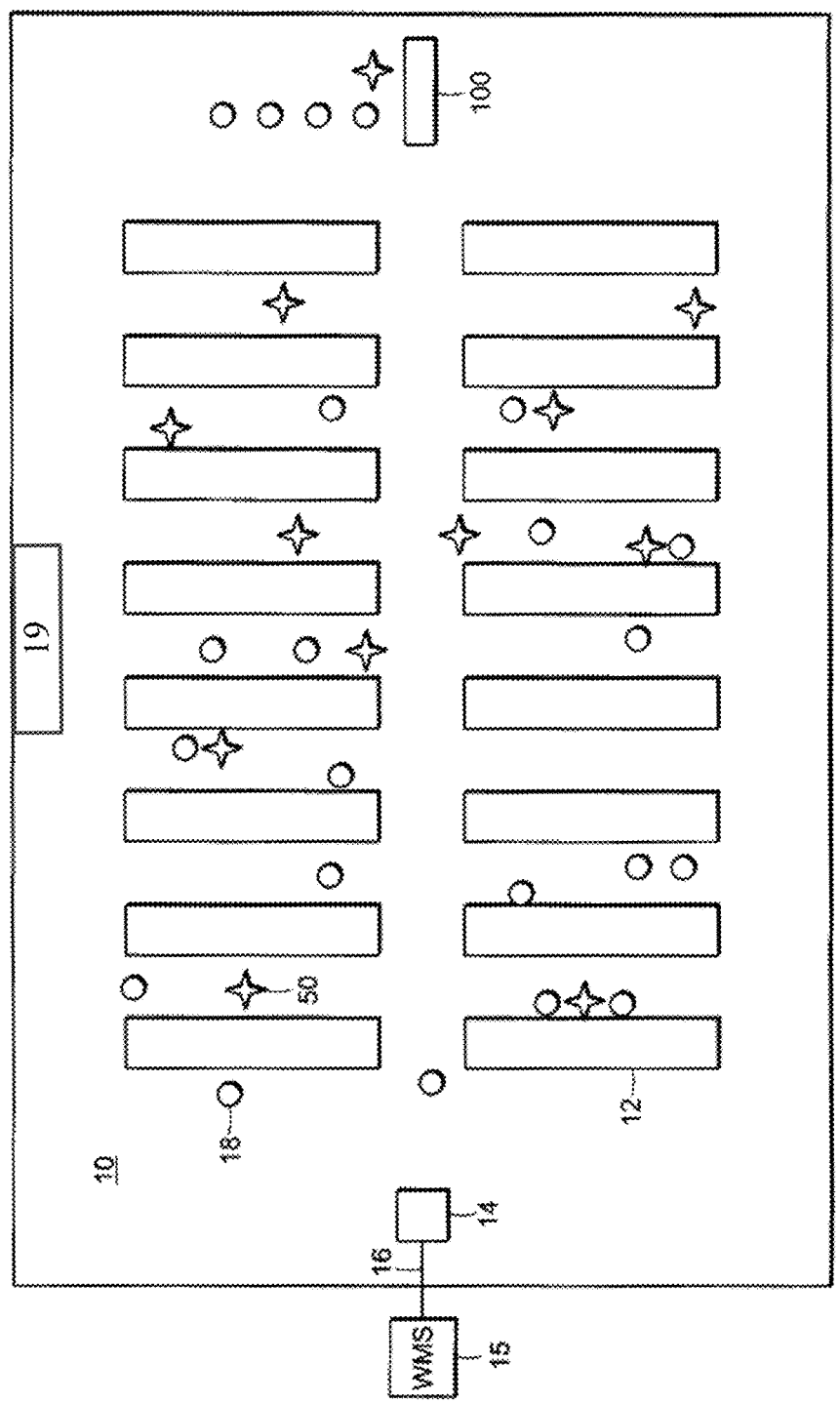
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to the docking of robots to an electrical charging system. Although not restricted to any particular robot application, one suitable application that the invention may be used in is order fulfillment. The use of robots in this application will be described to provide context for docking the robot to an electrical charging system.

While the description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products. These and other benefits and advantages will become readily apparent from the examples and illustrations described below.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10. Also shown is charging area 19, which is where one or more charging stations according to an aspect of the invention may be located.

Figure 2A:
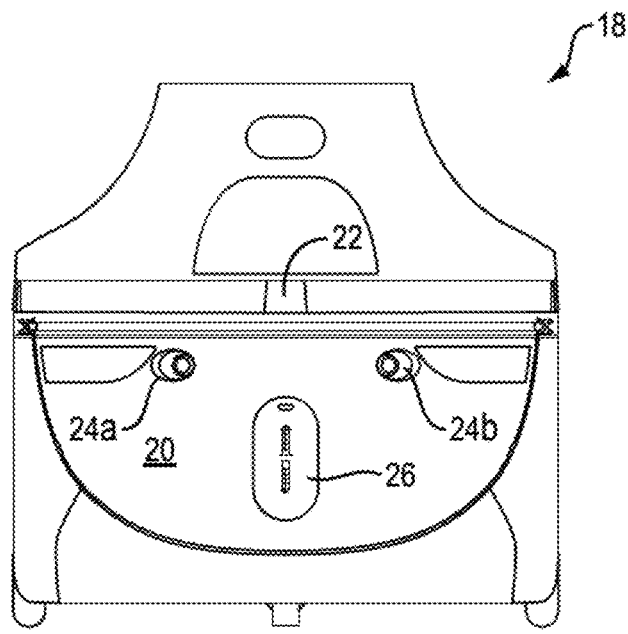
FIG. 2A is a front elevational view of a base of one of the robots used in the warehouse shown in FIG. 1.
Figure 2B:
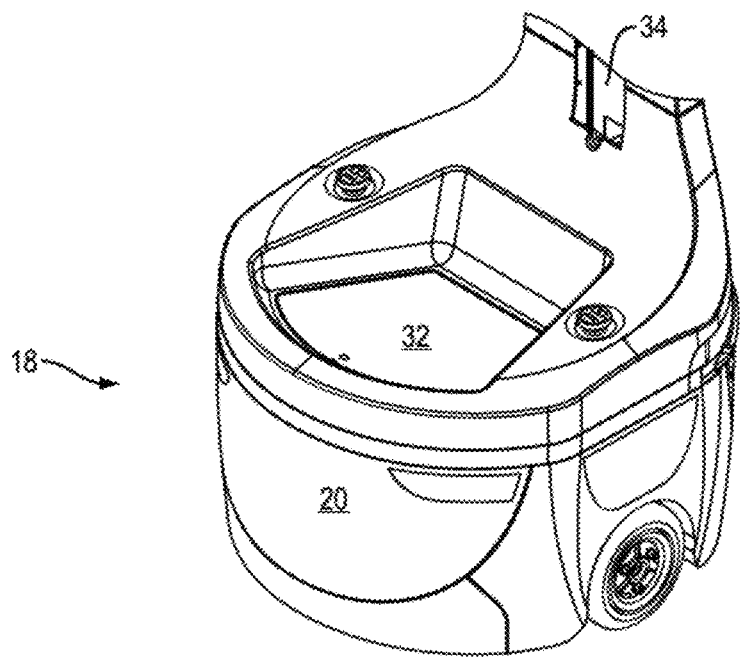
FIG. 2B is a perspective view of a base of one of the robots used in the warehouse shown in FIG. 1.
Figure 3:
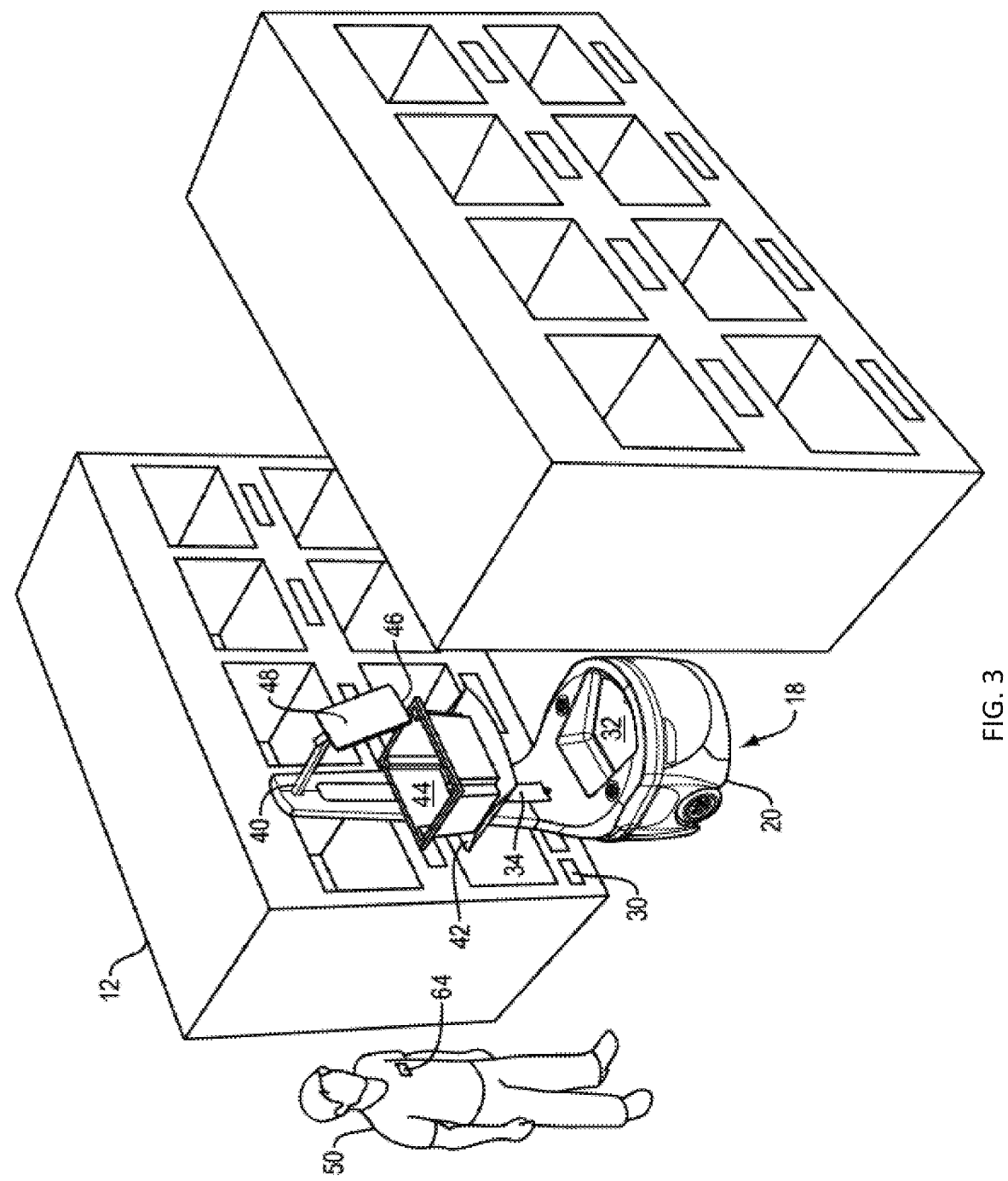
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from the order-server 14, and a pair of digital optical cameras 24a and 24b. The robot base also includes an electrical charging port 26 (depicted in more detail in FIGS. 10 and 11) for re-charging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. As noted above, the same navigation approach may be used to enable the robot to navigate to a charging station in order to recharge its battery.

Using one or more robots 18, a map of the warehouse 10 must be created and dynamically updated to determine the location of objects, both static and dynamic, as well as the locations of various fiducial markers dispersed throughout the warehouse. To do this, one of the robots 18 navigate the warehouse and build/update a map 10a, FIG. 4, utilizing its laser-radar 22 and simultaneous localization and mapping (SLAM), which is a computational method of constructing or updating a virtual map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as robot 18 travels throughout the space identifying open space 112, walls 114, objects 116, and other static obstacles such as shelves 12a in the space, based on the reflections it receives as the laser-radar scans the environment.

Figure 4:
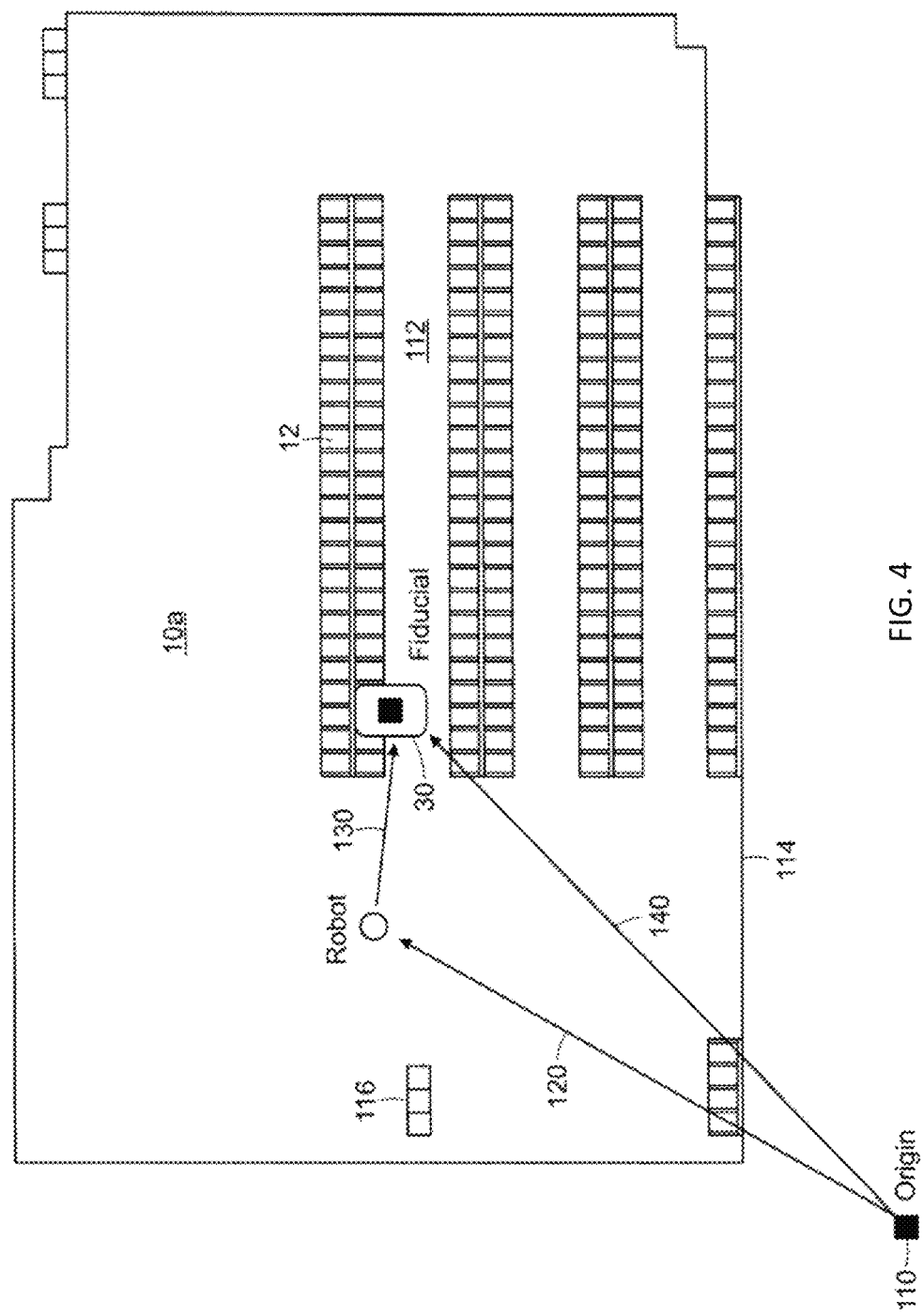
FIG. 4 is a partial map of the warehouse of FIG. 1 created using laser radar on the robot.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS. 3 and 4, is located by robot 18 using its cameras 24a and 24b, the location in the warehouse relative to origin 110 is determined. By using two cameras, one on either side of robot base, as shown in FIG. 2A, the robot 18 can have a relatively wide field of view (e.g. 120 degrees) extending out from both sides of the robot. This enables the robot to see, for example, fiducial markers on both sides of it as it travels up and down aisles of shelving.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
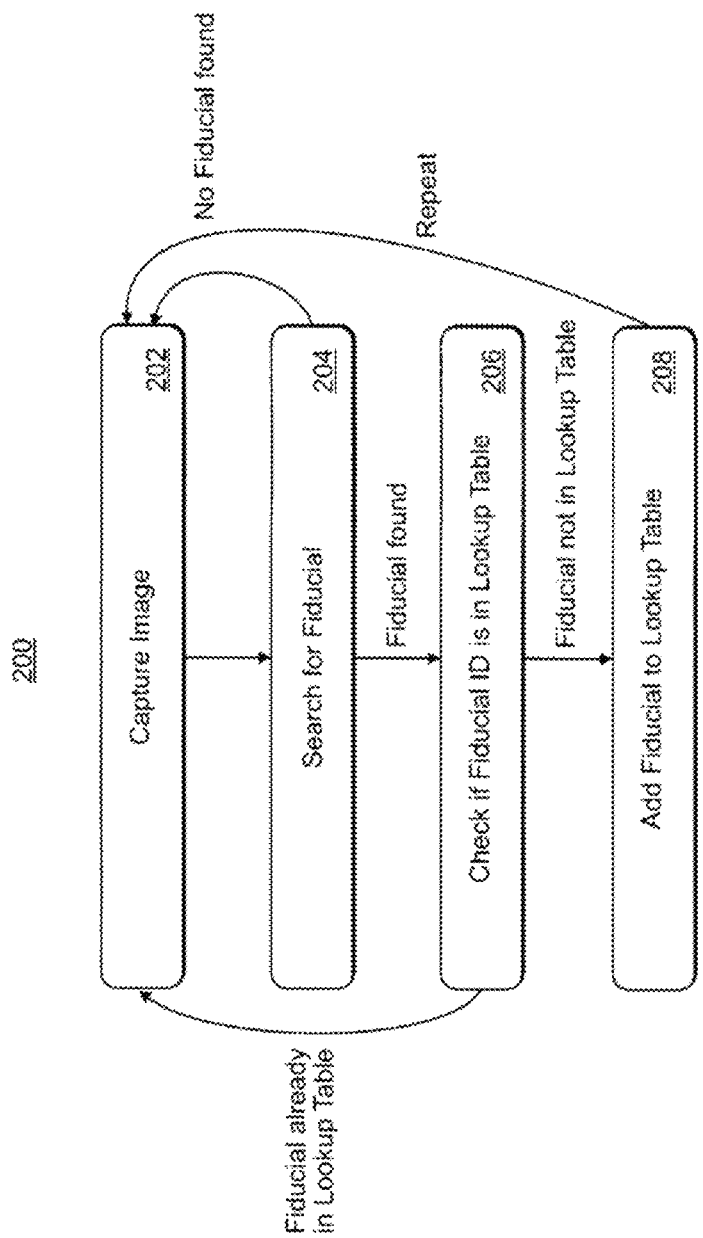
FIG. 5 is a flowchart depicting the process for locating fiducial markers dispersed throughout the warehouse and storing fiducial marker poses.

Flowchart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24a and 24b captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flowchart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19, FIG. 1, may also be stored in table 400 and correlated to fiducial IDs. From the fiducial IDs, the pose of the charging station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, robot 18 can determine the pose of the fiducial ID using the information in table 300, FIG. 6, and then navigate to the pose as described herein.

Figure 8:
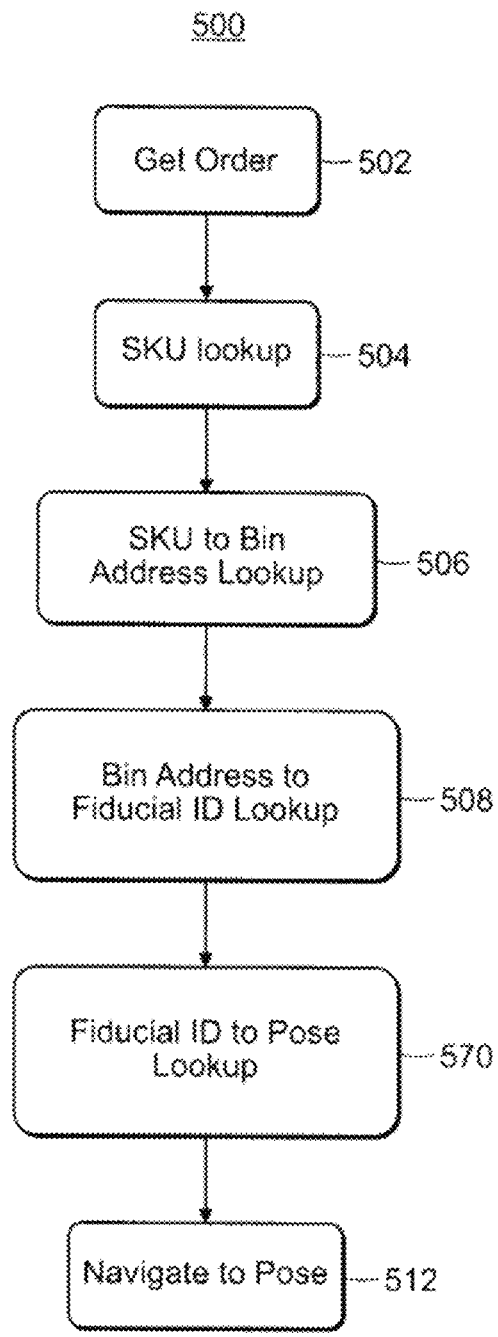
FIG. 8 is a flowchart depicting product SKU to pose mapping process.

The order fulfillment process according to this invention is depicted in flowchart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10*a* is achieved by many-to-many multiresolution scan matching (M3RSM) operating on the SLAM virtual map. Compared to brute force methods, M3RSM dramatically reduces the computational time for a robot to perform SLAM loop closure and scan matching, two critical steps in determining robot pose and position. Robot localization is further improved by minimizing the M3SRM search space according to methods disclosed in related U.S. application Ser. No. 15/712,222, entitled MULTI-RESOLUTION SCAN MATCHING WITH EXCLUSION ZONES, filed on Sep. 22, 2017, and incorporated by reference in its entirety herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker. ORCA optimally avoids collisions with other moving robots without requiring communication with the other robot(s). Navigation proceeds as a series of incremental movements along trajectories computed at the approximately 50 ms update intervals. Collision avoidance may be further improved by techniques described in related U.S. application Ser. No. 15/712,256, entitled DYNAMIC WINDOW APPROACH USING OPTIMAL RECIPROCAL COLLISION AVOIDANCE COST-CRITIC, filed on Sep. 22, 2017, and incorporated by reference in its entirety herein.

As described above, robots 50 need to be periodically re-charged. In addition to marking locations in the warehouse where items are stored, a fiducial marker may be placed at one or more electrical charging station(s) within the warehouse. When robot 18 is low on power it can navigate to a fiducial marker located at an electrical charging station so it can be recharged. Once there it can be manually recharged by having an operator connect the robot to the electrical charging system or the robot can use its navigation to dock itself at the electrical charging station.

Figure 9:
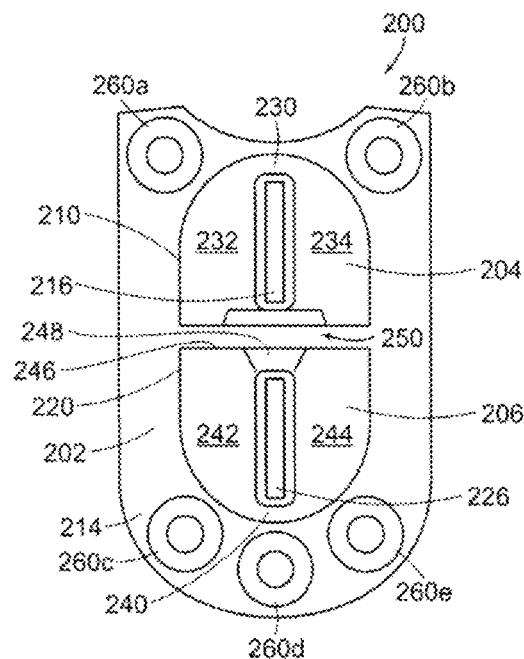
FIG. 9 is a front view of an electrical charging assembly according to this invention.
Figure 10:
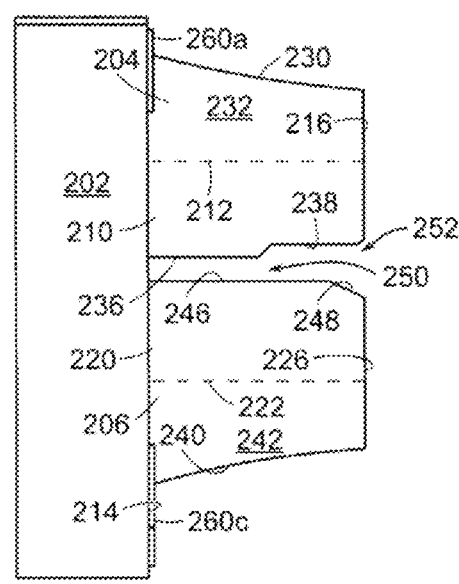
FIG. 10 is a side elevational view of the electrical charging assembly of FIG. 9.

As shown in FIGS. 9 and 10, electrical charging assembly 200 may be used at an electrical charging station. Electrical charging assembly 200 includes charger base 202 on which are disposed a first male terminal member 204 and a second male terminal member 206. Although not shown in this figure, a positive electrical input from the electrical service in the warehouse would be affixed to charger base 202 and electrically connected to one of the first male terminal member 204 or the second male terminal member 206. Also, a negative electrical input would be affixed to charger base 202 and electrically connected to the other of the first male terminal member 204 or the second male terminal member 206.

First male terminal member 204 has first base 210 affixed to and extending orthogonally along a first axis 212 from surface 214 of the charger base 202 and terminates in a first electrical contact 216. First electrical contact 216 may be in the form of a copper bus bar which extends into charger base 202 to which would be affixed one of the positive or negative electrical connections. Second male terminal member 206 has second base 220 affixed to and extending orthogonally along a second axis 222 from surface 214 of the charger base 202 and terminates in a second electrical contact 226. Second electrical contact 226 may also be in the form of a copper bus bar which extends into charger base 202 to which would be affixed the other of the positive or negative electrical connections.

The first male terminal member 204 has a plurality of external surfaces at least two of which have a curved shape from the first base 210 to the first electrical contact 216 forming a concave surface. In the embodiment depicted in FIGS. 9 and 10 there are three curved surfaces; namely, top curved surface 230 and opposing side curved surfaces 232 and 234, the three of which curve from first base 210 to first electrical contact 216, with particular radii of curvature, forming concave surfaces. In this embodiment, the radius of curvature of opposing side curved surfaces 232 and 234 is approximately 63.9 mm. The radius of curvature of top curved surface 230 is approximately 218.7 mm. These were determined empirically to provide for optimized alignment correction. More misalignment is expected in the horizontal direction as compared to the vertical direction; therefore, the opposing side curved surfaces are provided with a smaller radius of curvature. Of course, the radii of curvature of the curved surfaces may be varied depending on the application.

In addition, first male terminal member 204 has a flat surface 236 which is substantially parallel to first axis 212 and orthogonal to surface 214 of charger base 202. Flat surface 236 includes a recessed surface portion 238 proximate first electrical contact 216.

The second male terminal member 206 has a plurality of external surfaces at least two of which have a curved shape from the second base 220 to the second electrical contact 226, forming a concave surface. In the embodiment depicted in FIGS. 9 and 10 there are three curved surfaces; namely, bottom curved surface 240 and opposing side curved surfaces 242 and 244, the three of which curve from first base 220 to first electrical contact 226, with particular radii of curvature, forming concave surfaces. In this embodiment, the radius of curvature of opposing side curved surfaces 242 and 244 is approximately 63.9 mm. The radius of curvature of bottom curved surface 240 is approximately 218.7 mm. These were determined empirically to provide for optimized alignment correction. More misalignment is expected in the horizontal direction as compared to the vertical direction; therefore, the opposing side curved surfaces are provided with a smaller radius of curvature. Of course, the radii of curvature of the curved surfaces may be varied depending on the application.

In addition, second male terminal member 206 has a flat surface 246, which is substantially parallel to second axis 222 and orthogonal to surface 214 of charger base 202. Flat surface 246 includes a flared surface portion 248 proximate second electrical contact 226.

There is a cavity 250 formed between the first male terminal member 204 and the second male terminal member 206 defined by the at least one flat surface 236 of the first male terminal member 204 and the at least one flat surface 246 of the second male terminal member 206. Cavity 250 has an opening 252 between the first electrical contact 216 and the second electrical contact 226. At opening 252, the recessed surface portion 238 of flat surface 236 and the flared surface portion 248 of flat surface 246, are present.

Referring again to FIGS. 9 and 10, metal contacts 260a-e are disposed on charger base 202. These metal contacts engage with corresponding magnets on electrical charging port 300, described below, and secure electrical charging assembly 200 and electrical charging port 300 in place while charging. Alternatively, the magnets could be disposed on the charger base 202 with the metal contacts on charging port 300.

If the robot is docking to a fixed electrical charging station, it may use camera 24a and 24b to maneuver it into position so that electrical charging port 300 can mate with electrical charging assembly 200. The cameras may use the fiducial markers associated with the charging station as a reference point for fine localization, which will be described in more detail below. As the robot maneuvers into place, achieving perfect alignment for mating of the electrical contacts 216 and 226 of the electrical assembly 200 with electrical contacts 304 and 306, respectively, of electrical charging port 300 can be difficult. Therefore, electrical charging assembly 200 and electrical charging port 300 have been specifically designed in order to ensure easier, more efficient, and less problematic mating to allow the robots to electrically re-charge more quickly.

Figure 11:
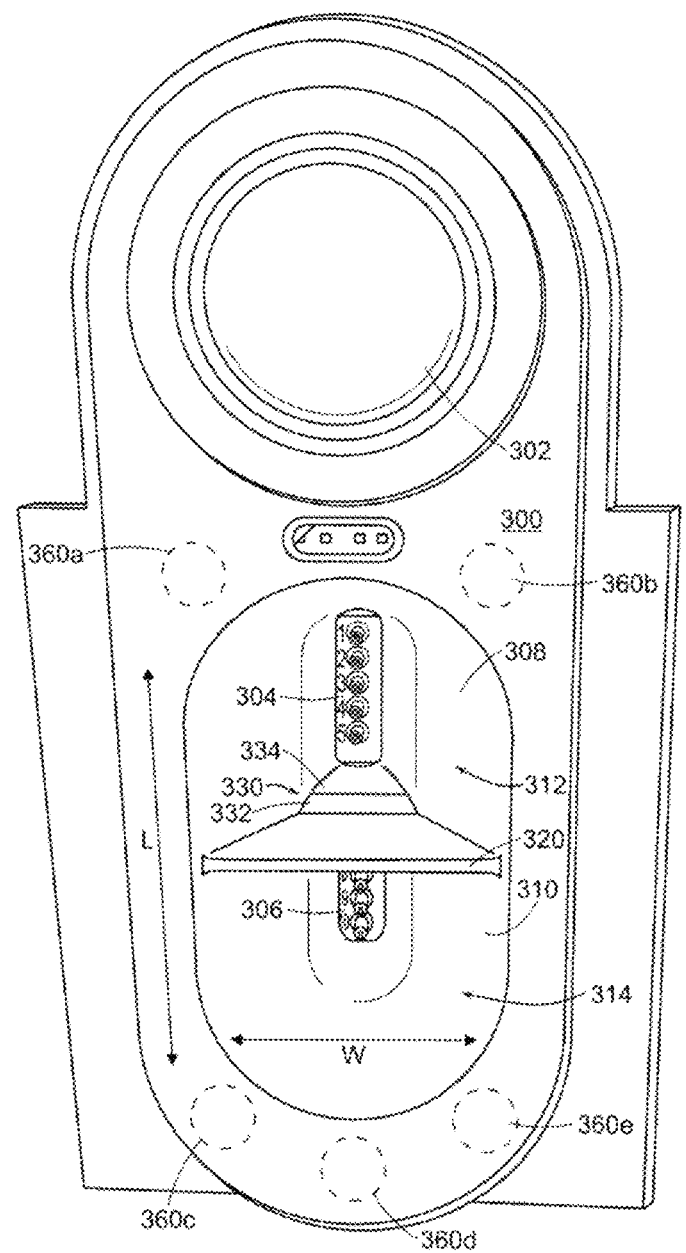
FIG. 11 is a perspective view of the electrical charging port of FIG. 10.
Figure 12:
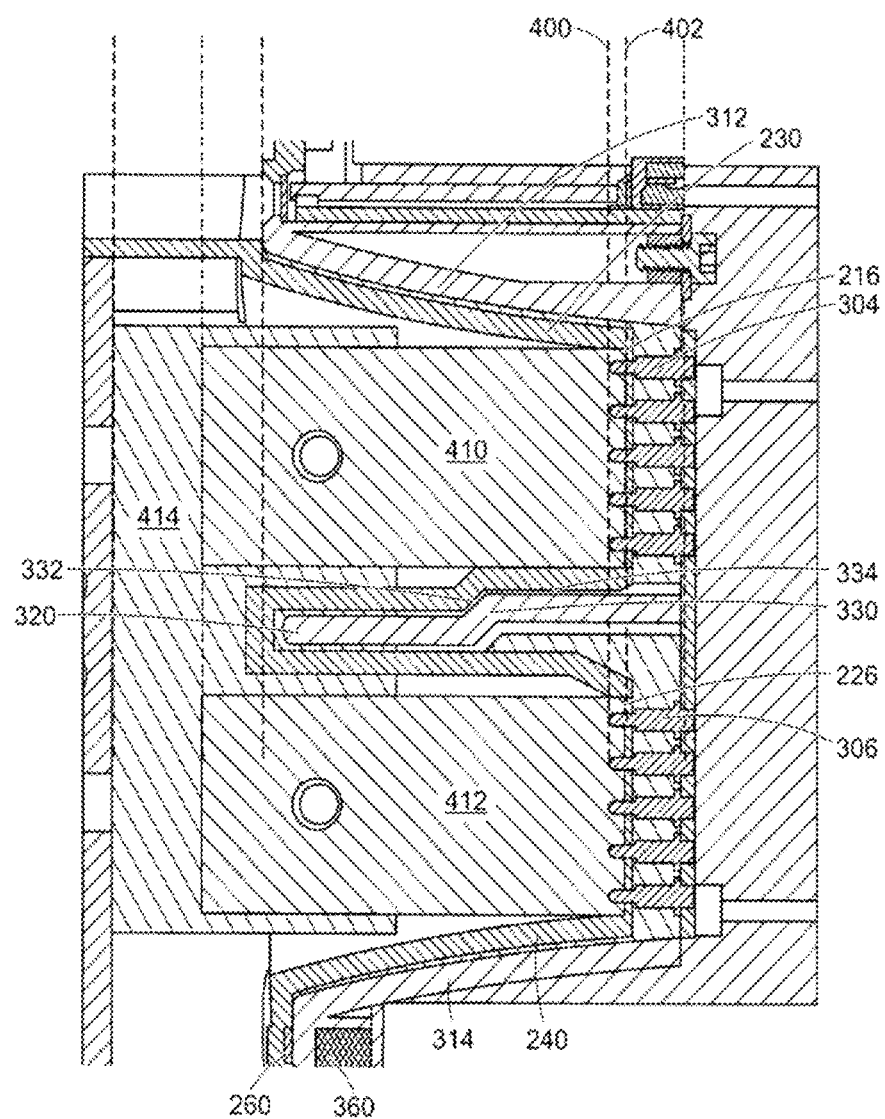
FIG. 12 is a cross-sectional view of the electrical charging assembly mated with the electrical charging port.

As can be seen in FIGS. 11 and 12, electrical charging port 300 includes a first cavity 308 and second cavity 310, which are configured to receive and engage with first male terminal member 204 second male terminal member 206, respectively, of electrical charging assembly 200, as robot base 20a is docking. Cavity 308 has concave, curved surfaces 312 which are complimentary to the curved surfaces 230, 232 and 234 of first male terminal member 204. In other words, the first cavity 308 may include curved surfaces 312 having radii of curvature substantially equal to the radii of curvature of the curved external surfaces (230, 232, and 234) of first male terminal member 204. Substantially equal in this case means just slightly larger to allow insertion and removal of first male terminal member 204 in cavity 308. Cavity 310 also has concave, curved surfaces 314 which are complimentary to the curved surfaces 240, 242 and 244 of second male terminal member 206. In other words, the second cavity 310 may include curved surfaces 314 having radii of curvature substantially equal to the radii of curvature of the curved external surfaces (240, 242, and 244) of second male terminal member 206. Substantially equal in this case means just slightly larger to allow insertion and removal of second male terminal member 206 in cavity 310.

The openings of cavities 308 and 310 are wider and longer than the width/length of the electrical contacts 216/226 of first male terminal member 204 second male terminal member 206. The extra width/length allows the first male terminal member 204 second male terminal member 206 to be more easily received within cavities 308 and 310 even if they are somewhat misaligned in the horizontal/vertical directions during the mating process. As the robot moves toward electrical charging assembly 200, the engagement of the complimentarily curved surfaces cause the first male terminal member 204 and the second male terminal member 206 to be guided into alignment so that engagement between electrical contacts 216/226 of electrical charging assembly and electrical contacts 304/306 of electrical charging port 300 will occur.

Thus, the radii of mating parts (male terminal members and cavities) are designed to provide coarse alignment when the male terminal members are first inserted into the cavities, and fine adjustment as full insertion is approached.

The electrical charging system provides an additional feature for easier vertical alignment. This is accomplished by the interaction of divider 320, which is between cavities 308 and 310, in combination with opening 352 of cavity 350 of electrical charging assembly 200. Flared surface portion 248 provides a wider opening so, if there is vertical misalignment, it causes the divider 320 to ride up vertically into place in cavity 350, as the docking process occurs.

When the first and second male terminals 204 and 206 are fully inserted into cavities 308 and 310, electrical charging assembly 200 is secured in place with electrical charging port 300 by means of magnets 360a-e, which engage with metal contacts 260a-e on electrical charging assembly 200. The magnets may be disposed beneath the external surface of electrical charging port 300 and, as such, they are shown in phantom.

There is an additional feature included in the electrical charging system, which is useful in the case of manual charging by an operator. If the electrical charging assembly 200 were inserted into the electrical charging port 300 improperly, i.e. upside down with electrical contact 216 of electrical charging assembly 200 connected to electrical contacts 306 of electrical charging port 300 and with electrical contact 226 of electrical charging assembly connected to electrical contacts 304 of electrical charging port 300, the polarities would be reversed and significant damage to robot base 20a would result.

To prevent this from happening, a stop 330 (see FIGS. 11 and 12) is included on the surface of divider 320 of electrical charging port 300. The stop 330 has an angled surface portion 332 and flat surface portion 334. As shown in FIG. 10, within cavity 250 of electrical charging assembly 200, there is a recessed surface portion 238, which allows for full insertion of electrical charging assembly 200 into electrical charging port 300. Recess 238 allows for clearance by first male terminal member 204 of stop 330 as the angled surface portion 332 and the flat surface portion 334 of stop 330 engage with the angled portion and flat portion of recessed surface portion 238 like a puzzle piece. If the electrical charging assembly 200 were upside down, when inserted into electrical charging port 300 surface 246 of second male terminal member 206 would contact stop 330 and be prevented from full insertion and contact with electrical contacts 304.

As shown in FIG. 12, when electrical contacts 216 and 226 of male terminal members 204 and 206, respectively, engage with electrical contacts 304 and 306, the electrical contacts 304 and 306 are compressed, as these contacts may be in the form of spring loaded pins. Electrical contacts 304 and 306 may be compressed from their fully extended position at line 400 to their compressed position (not shown) at line 402. Each of electrical contacts 304 and 306 are shown to include five spring loaded pins. The number of pins used is dependent upon the expected electrical current to be carried during the charging process and the capacity of the individual pins. The use of multiple spring loaded pins for the electrical contacts is beneficial to ensure proper contact with the electrical contacts 216 and 226 of male terminal members 204 and 206 even in the case of manufacturing variations and wear on components.

When electrical contacts 304 and 306 are in the compressed position, magnets 360a-e of electrical charging port 300 are in close proximity with metal contacts 260a-e of electrical charging assembly 200 and they magnetically engage to secure in place electrical charging assembly 200 and electrical charging port 300. In this position, it can be seen that upper and lower curved surfaces 230 and 240 of male terminal members 204 and 206, respectively, are complimentarily engaged with surfaces 312 and 314 of cavities 308 and 310, respectively.

Also depicted in FIG. 12 are bus bar 410 of first male terminal member 204 and bus bar 412 of second male terminal member 206. The bus bars are connected to mount 414 to affix them within electrical charging assembly 200 at the end opposite electrical contacts 216 and 226.

Figure 13A:
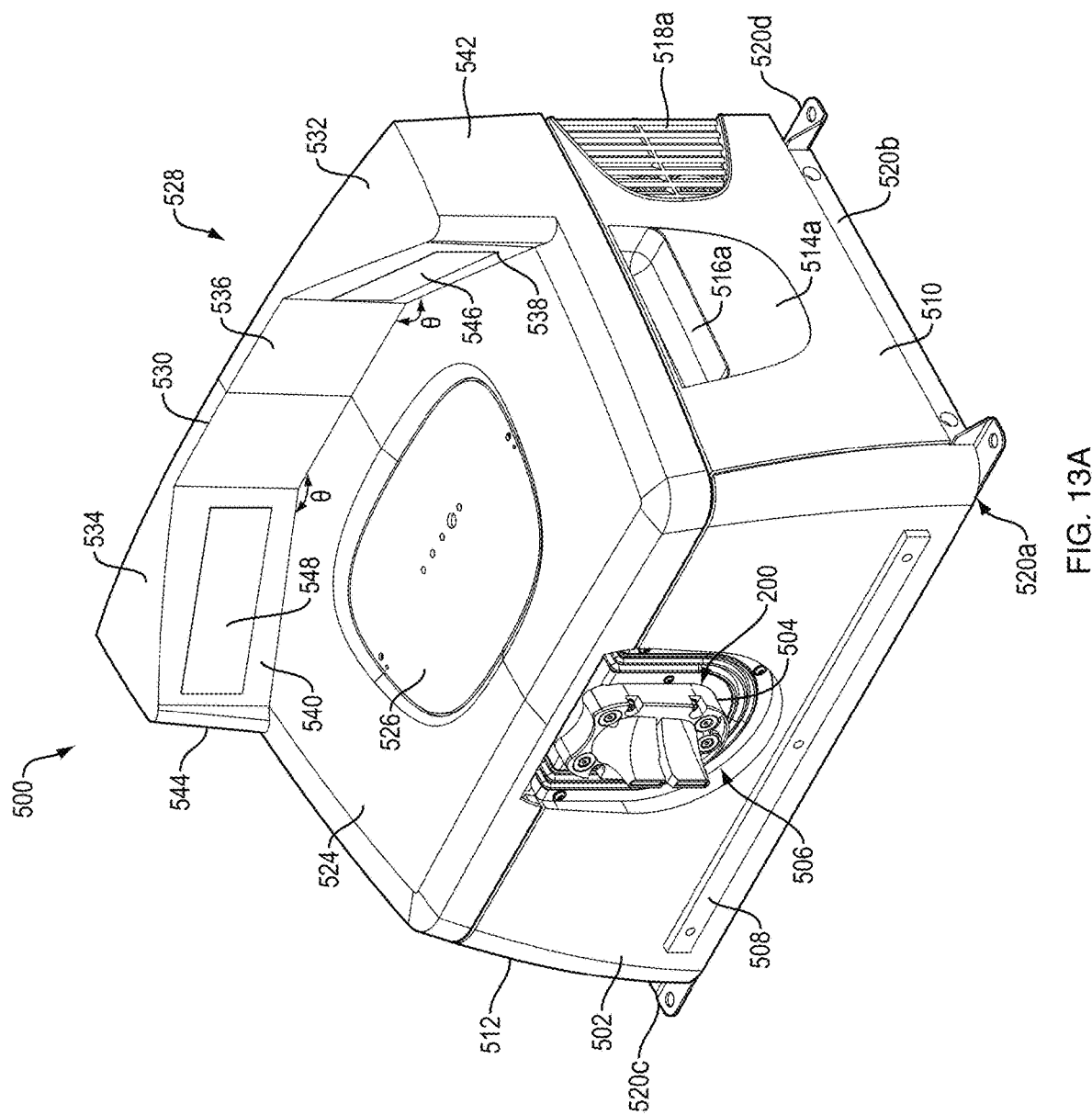
FIG. 13A is a perspective view of the charger docking station according to this invention.
Figure 14A:
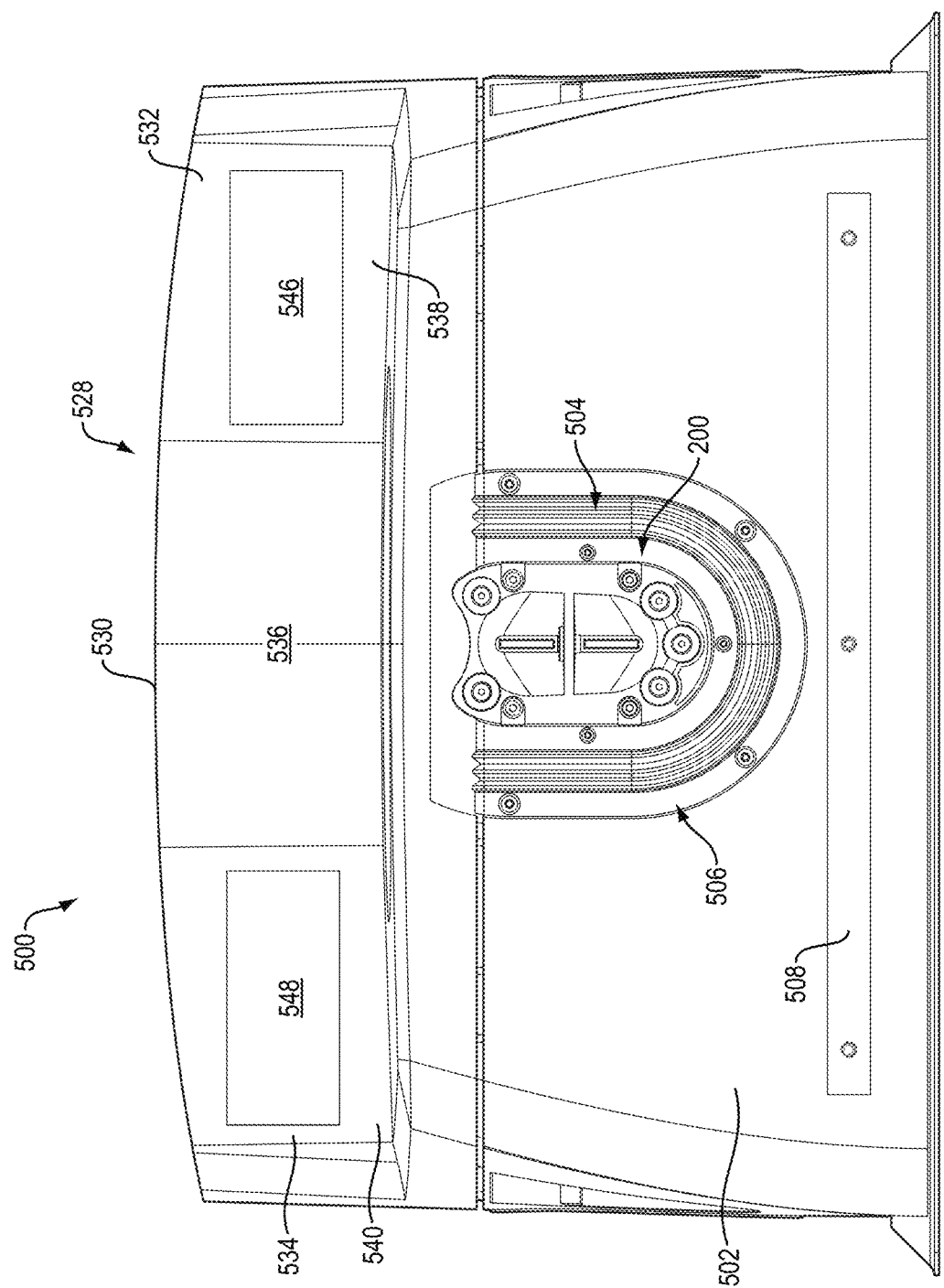
FIG. 14A is a front view of the charger docking station of FIG. 13A.

A charger docking station 500 according to an aspect of this invention is depicted in FIGS. 13-16 and 17. Referring particularly to FIGS. 13 and 14, charger docking station 500 includes electrical charging assembly 200, as described above, which projects from front cover 502 of charger docking station 500. Electrical charging assembly 200 is mounted to charger docking station 500 on U-shaped rubber bellows mount 504 in order to seal opening 506 in front cover 502 while also allowing electrical charging assembly 200 to move in six degrees of freedom (as will be described below) to facilitate a smooth docking process of a robot when recharging is needed.

Also shown is protective bumper 508, which may be made of metal, mounted horizontally across the bottom portion of front cover 502 to protect the charger docking station 500 from damage in the event that a robot does not smoothly dock. Charger docking station 500 further includes right side cover 510 and left side cover 512 (not visible in FIG. 13A). In right side cover opening 514a is located grip area 516a which allows a hand to be inserted for more easily lifting the charger docking station 500, as shown in FIG. 15A. Although not visible in this view, a similar opening and grip area is included in left side cover 512, which are depicted in FIG. 16A as opening 514b and grip area 516b. Also shown in an opening at the back of right side cover 510 are vents 518a to provide cooling for the electrical components within charger docking station 500. A similar vent 518b is included in the left side cover 512 visible in FIG. 16A.

A metal frame comprising front frame member 520a, right side frame member 520b, left side frame member 520c, and back side frame member 520d are interconnected to form the base structure for charger docking station 500. Referring to FIG. 13B, each of the frame members is secured to a floor in the warehouse by means of bolts 521a-d and protective bumper 508 is secured to metal frame 520 via front frame member 520a. Since protective bumper 508 is external to and protrudes out from front cover 502, it is the first point of impact with a robot as it docks with charger docking station 500. In the event of an inadvertent high force impact by a robot, such high forces will be imparted on the protective bumper rather than the front cover 502. Front cover 502 as well as right side cover 510 and left side cover 512 are typically made a hard plastic material and are susceptible to cracking/breaking if impacted by a robot. The forces imparted on the protective bumper 508 are further diverted to metal frame 520 through front frame member 520a. Front frame member 520a comprises a C-shaped member that extends across the width of charging station 500 and a flange integral with and extending from a top surface of the C-shaped member. Protective bumper 508 interconnects to the flange via a plurality of apertures in front cover 502. The forces from bumper 508 are transmitted to the front frame member through the flange and c-shaped member and further transmitted to the right, left and back side frame members 520b-d. Ultimately the forces are transmitted through bolts 521a-d to the warehouse floor. Thus, this protective bumper system absorbs and diverts forces imparted by a robot away from the hard plastic front cover 502, protecting it from damage.

Top cover 524, which is also made of a hard plastic material, includes a user interface panel 526 disposed in a cavity in the surface of top cover 524 which may include certain indicators and controls for a user to operate the charger docking station. For example, lighting signals to indicate various states such as "Ready", "Charging", "Power On", "Recovery Mode", and "Fault" or "E-Stop" may be included. Buttons such as "Power on/off", "Start manual charge", "Undock", "Reset", and "E-Stop" may be included.

Along the back edge of top cover 524 is a back panel 528, which comprises a center panel section 530 and side panel sections 532 and 534 on the right and left sides, respectively, of center panel 530. Center panel 530 has a rectangular front surface 536 which is substantially parallel to front cover 502. Right side panel 532 has a rectangular front surface 538 and left side panel 534 has a rectangular front surface 540.

Right and left side panels 532 and 534 have wide sidewalls 542 and 544, respectively, on one side and converge to narrower widths on the other sides which interconnect with center panel section 530. Thus, right and left side panels 532 and 534 are wedge-shaped. As a result, their front surfaces 538 and 540 are not parallel with front surface 536 of center panel 530 or front cover 502. They are each disposed at an angle, θ, with respect to surface 536. Fiducial markers 546 and 548 (e.g. a two-dimensional bar code) disposed on front surfaces 538 and 540, respectively, are also disposed at the angle, θ, relative to front surface 536 and the front cover 502.

As will be described in detail below, in one aspect the robots may use the angled fiducial markers for precision navigation during the process of docking with the charger docking station by viewing them with their onboard cameras. To generally navigate to the charger docking station when recharging is needed, the robots navigate in the same manner as they do when navigating to product bins as described above. Charging station 500 may be associated with a pose located in close proximity to the front cover 502 and generally aligned (rotationally) such that the robots' on board cameras are facing toward back panel 528.

Referring to FIGS. 13B and 14B, compliant members 550a-d, which may include springs, are connected to legs 551a-d (legs 551c and 551d are not visible), respectively, on electrical charging assembly 200 to allow a certain amount of movement in all six degrees of freedom to account for small errors in navigating the robot to the charger docking station while still enabling proper mechanical and electrical connection between the electrical charging assembly 200 and electrical charging port 300, as shown in FIG. 12, for example.

Figure 15B:
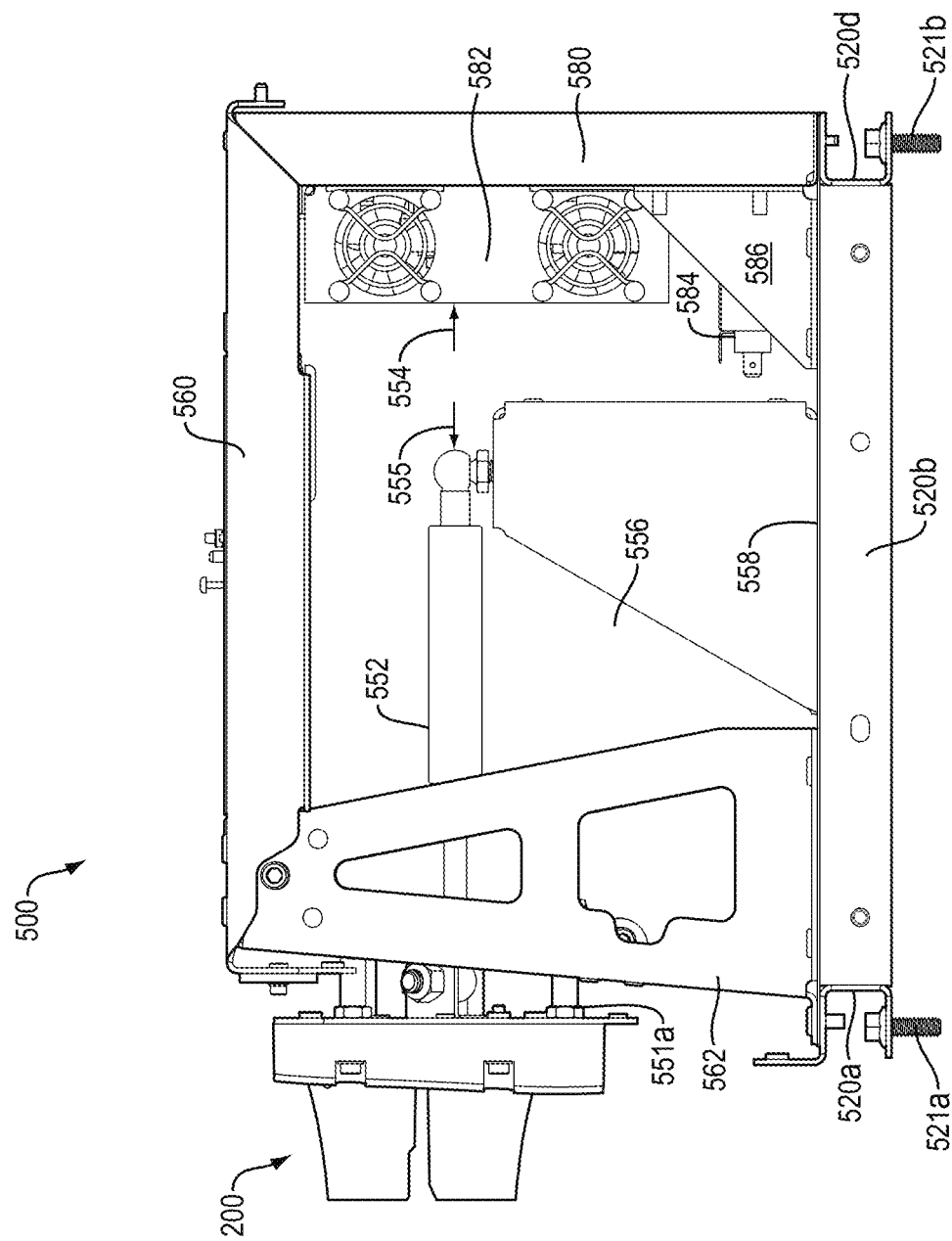
FIG. 15B is the left side view of the charger docking station of FIG. 15A with the exterior cover removed depicting the interior of the charger docking station.
Figure 16A:
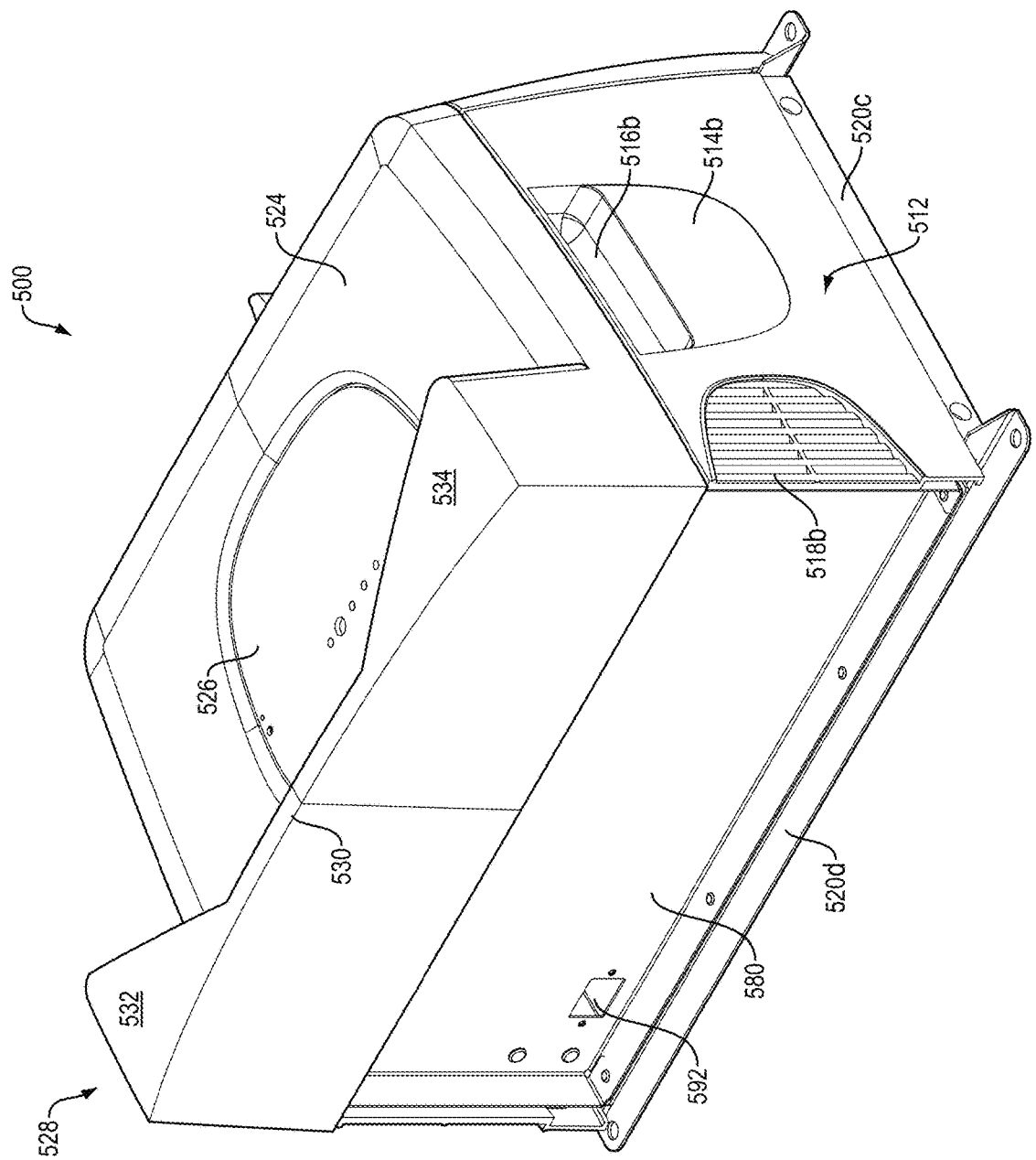
FIG. 16A is a rear perspective view of the charger docking station of FIG. 13A.

In addition, as can be seen in FIG. 15B, gas spring 552 is connected to electrical charging assembly 200 to stabilize it as it moves along the axis of gas spring 552 as indicated by arrows 554 and 555. Gas spring 552 is mounted on frame 556 which is affixed to floor panel 558 of the charger docking station 500. As the robot moves toward charger docking station 500 during the mating process, electrical charging port 300 (described above) contacts electrical charging assembly 200 and applies a force in the direction of arrow 554. Gas spring 552 provides resistance in the direction of arrow 555 sufficient to allow some amount of movement during mating of electrical charging port 300 with electrical charging assembly 200 but prevent excessive movement in the direction of arrow 554 to act as a stop and ensure proper mating.

In addition, as the electrical charging port 300 is being retracted from the electrical charging assembly 200 during the un-mating process, due to the magnetic connection between the electrical charging assembly 200 and the electrical charging port 300 (described above), electrical charging assembly 200 will be pulled in the direction of arrow 555 until the magnetic force is overcome. Gas spring 552 also ensures that the movement is limited, by providing a force in the direction of arrow 554.

While the electrical charging port 300 (which is the female portion of the connector) is described herein to be mounted on the robot and the electrical charging assembly 200 (which is the male portion of the connector) is described herein as being mounted on the charging station, of course, these components could be reversed. In which case the electrical charging port 300 would be mounted on the charging station and the electrical charging assembly 200 would be mounted on the robot. Moreover, as will be apparent to those skilled in the art, other charger ports and designs may be used in connection with the embodiments described herein.

Referring again to FIG. 13B, top panel 560, which is supported in part by frame legs 562 and 564 mounted on floor panel 558, includes a cavity in which are housed controller board 572 and an infrared (IR) transceiver board 574. Controller board 572 provides overall control of charger docking station 500, including activating the charging protocols, selecting charging parameters and profiles, monitoring charging conditions and status (e.g. charging state and battery temperature) and communications with the robot, all of which are described in more detail below. The IR transceiver board 574 is used for communication with the robot during the docking and charging processes and may utilize an IrDA (Infrared Data Association) communications protocol.

Figure 16B:
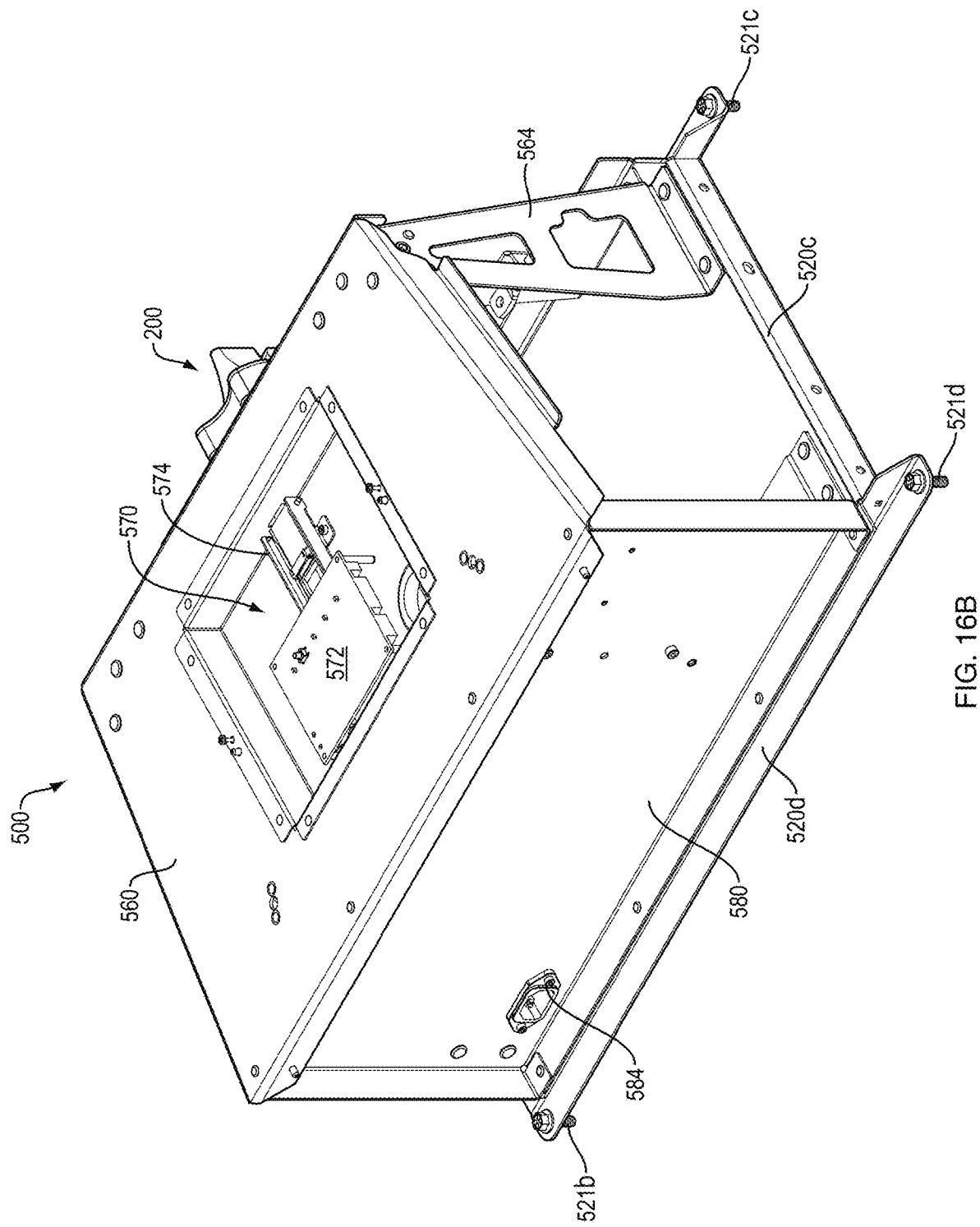
FIG. 16B is the rear perspective view of the charger docking station of FIG. 16A with the exterior cover removed depicting the interior of the charger docking station.

Continuing to refer to FIG. 13B as well as FIG. 15B, back wall panel 580 is shown to support power supply 582 which is powered by the warehouse power. Back wall panel 580 may also function as a heat sink for power supply 582 and may be made of a different metal than the other panels to better conduct heat. Back panel 580 further supports top panel 560 along with frame legs 562 and 564. The warehouse power is fed to charger docking station 500 through connector 584, which may be an IEC connector, for example. Wall 586 connected to floor panel 558 and positioned adjacent to connector 584 may be used to provide additional protection for the power supply to the charger docking station FIGS. 16A and 16B provide a perspective view from the rear of charger docking station 500 with the cover on and off, respectively. These views also allow for the right side of charger docking station to be seen. In FIG. 16A back wall 580 is shown to include a port 592 through which the power supply from the house is fed to connect to electrical connector 584. The back of electrical connector 584, can be seen protruding through a hole in back wall 580, FIG. 16B.

Robot Docking

Figure 17:
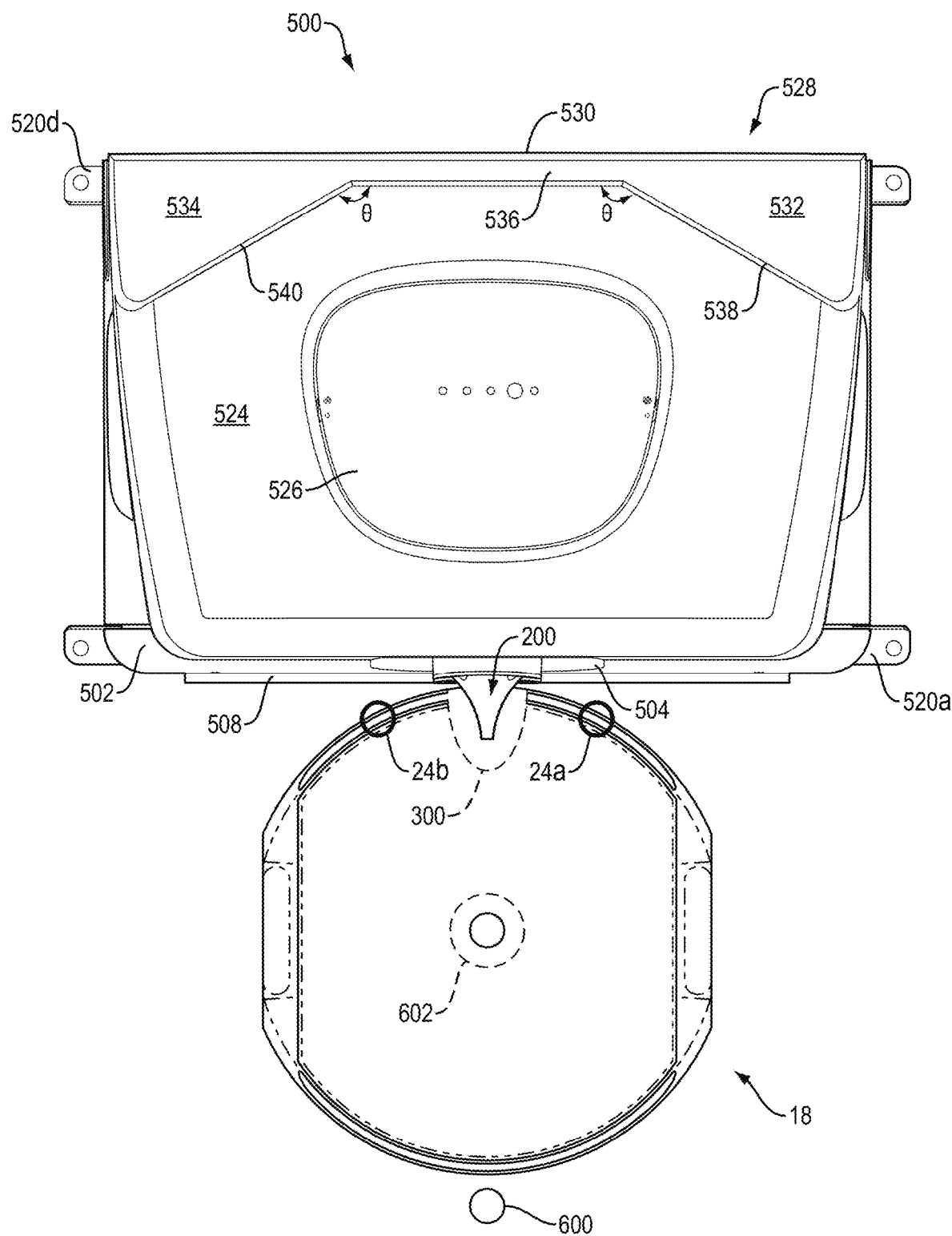
FIG. 17 is a top view of the charger docking station of FIG. 13A shown with a docked robot.
Figure 18:
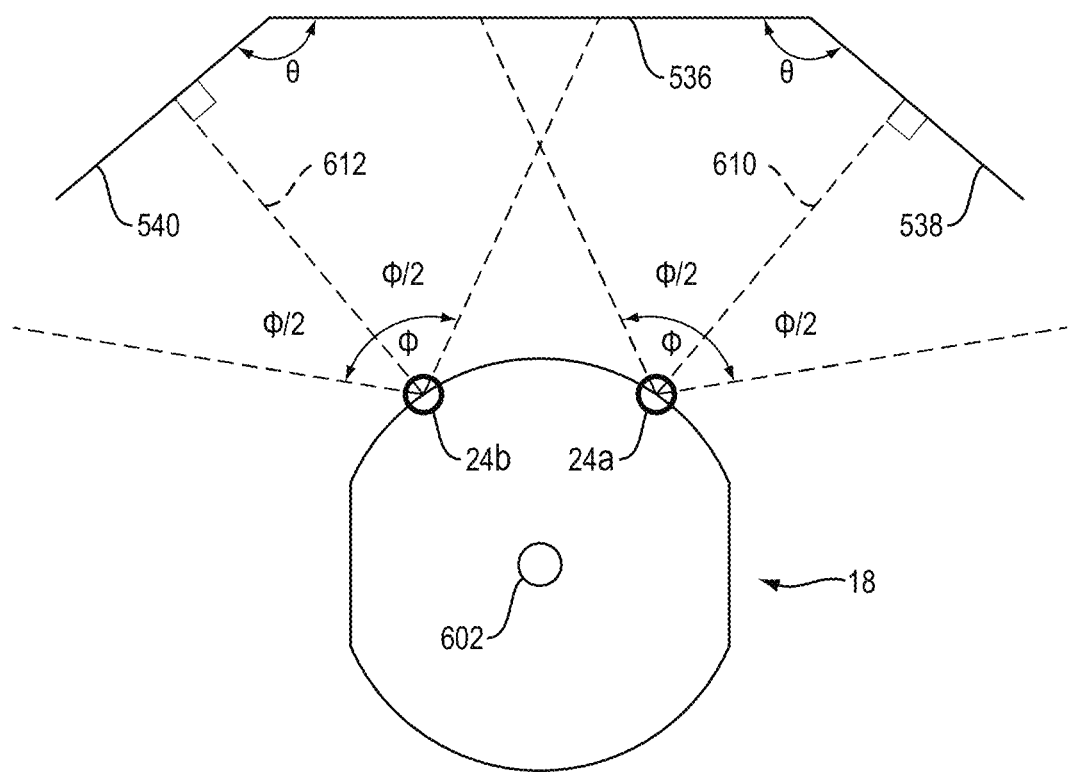
FIG. 18 is a schematic view of a robot docking with the charging station according to an aspect of this invention.

The docking of a robot to the electrical charging station 500 for recharging, according to one embodiment, is described with regard to FIGS. 17 and 18. In FIG. 17, robot 18 having electrical charging port 300 is shown mated to electrical charging assembly 200 of charging station 500. Robot 18 may, for example, navigate to location 600, which is defined by a pose stored for the charging station. Navigation to pose 600 is undertaken in the manner described above for navigating robots throughout the warehouse to various bin locations. Once at pose 600, a precision navigation process is undertaken to position the robot 18 at location 602, in which location the electrical charging port 300 is mated with electrical charging assembly 200 and robot 18 is docked at charging station 500 for recharging.

One such precision docking process utilizes the orientation of surfaces 538 and 540 (and fiducials 546 and 548, respectively) relative to cameras 24a and 24 is described with regard to FIG. 18. As shown in FIG. 18, robot 18 is located at position 602, thus it is docked at charging station 500. In this position, the field of view Φ (approximately 79.4 degrees) of camera 24a is shown to span across surfaces 536 and 538. The optical axis 610 (i.e. the centerline of the field of view or Φ/2) of camera 24a intersects surface 38 and fiducial 46 at a substantially perpendicular angle. In addition, in this position, the field of view Φ (approximately 79.4 degrees) of camera 24b is shown to span across surfaces 536 and 540, slightly overlapping the field of view of camera 24a. The combined field of views of the cameras provides the robot 18 with an effective field of view of approximately 120 degrees. The combined field of few is less than the sum of the fields of view of the cameras, due to the overlapping sections creating a blind spot for the robot.

The optical axis 612 (i.e. the centerline of the field of view or Φ/2) of camera 24b intersects surface 40 and fiducial 48 at a perpendicular angle. In order to ensure that when docked the optical axes of the cameras will be aligned perpendicular to surfaces, 538 and 540, the angle θ which is the orientation of surfaces 538 and 540 relative to surface 536 must be properly set. In this example, the angle θ is approximately 150 degrees. By positioning the fiducials in this manner, the visibility of the fiducials by the cameras 24a and 24b is increased.

As described above, since the cameras are offset from the center of the robot they combine to provide a wide field of view. However, the orientation of the cameras make viewing the fiducials on the charging station challenging. To address this issue, the fiducials may be oriented at an angle to better align with the cameras, which makes the fiducials easier to more accurately read. This may be accomplished by orienting the optical axis of the camera to be at a substantially perpendicular angle to and centered on the fiducial when the robot is in the docked position, as is shown in FIG. 18.

Once at pose 600, FIG. 17, the robot may make use of the perceived positions and orientations of the fiducials 546 and 548 on surfaces 538 and 540, respectively, in its camera frames. At pose 600, robot 18 is close enough to perceive fiducials 546 and 548 and is approximately centered on charging station 500. A docking control algorithm may be used which permits for errors in the robot navigating to this initial pose location. In other words, the navigation approach used to arrive at pose 600, which may use 5 cm-resolution maps, may not precisely position robot 18 at the pose location. While positioned nominally at pose 600, robot 18 obtains information about the position and orientation of fiducials 546 and 548 using its cameras 24a and 24b. As it moves toward charging station 500, it attempts to minimize two error quantities as follows:

(1) Each camera will detect one fiducial: the left and right cameras will detect the left and right fiducials, respectively. The fiducials, once detected, can be transformed internally so that to the robot, they appear to be perfectly perpendicular to the path of the robot (i.e., "flat", as perceived from the camera, rather than appearing skewed). We can then detect the relative sizes of each fiducial marker, and use that to determine if the robot is closer to one fiducial than the other. This indicates that the robot is not perfectly centered in its approach, and needs to move towards the center line. If we refer to the pixel area of the corrected left fiducial as SL and the pixel area of the corrected right fiducial as SR, then the robot needs to minimize |SR−SL|.

(2) Within the left camera image, the left dock fiducial will be some number of pixels from the right side of the image. We will call this number DL. Likewise, the for the right camera image, the right dock fiducial will be some number of pixels DR from the left side of the image. The robot therefore needs to minimize |DR−DL|.

As the robot needs to correct for the error in (1) first, we issue a constant linear velocity to the robot, and issue a rotational velocity of kS (SR−SL) to the robot until this value gets below some threshold TS. The term kS is a proportional control constant whose value is in the range (0, 1]. When the threshold TS is satisfied, the robot attempts to minimize the error in (2) by issuing a rotational velocity to the robot of kD (DR−DL), where kD is also a proportional control constant in the range of (0, 1]. We continue doing this until either (a) the robot reaches the dock, or (b) the error |SL−SR| grows outside the threshold TS, at which point we switch back to minimizing the error in (1).

The above described precision navigation approach is one example of various approaches that could be used to dock robot 18 with charging station 500. In other embodiments, the precision navigation approach that causes the robot to dock to the electrical charging system may employ techniques similar to those used by the robot more generally when navigating about the warehouse.

The following description of the robot system and robot navigation, including the examples given for navigating the robot to the charging system, is not limiting to the techniques shown and described below for localizing and controlling the robot during precision docking. That is, other techniques for navigating the robot to the initial pose of the charging system may be employed by robots having alternative systems and operation without loss of application of the invention herein to the techniques described for precision docking.

Robot System

Figure 19:
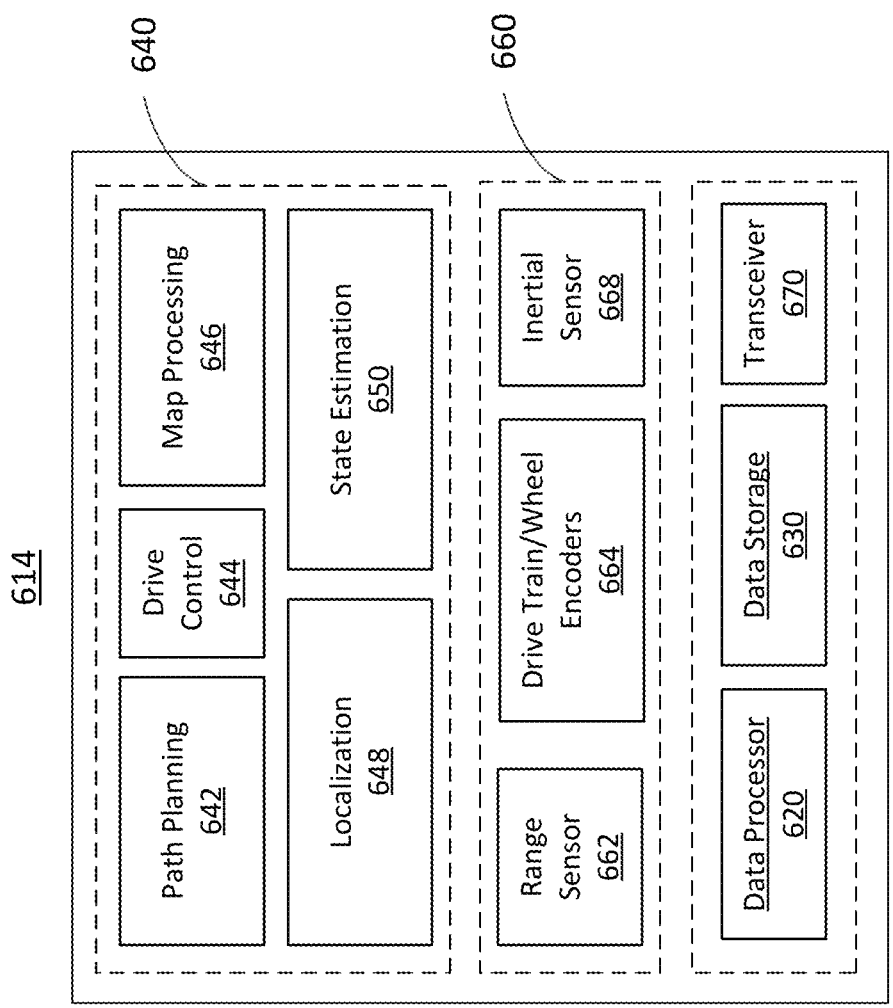
FIG. 19 shows one embodiment of a robot system for use with the methods and systems of present invention.

FIG. 19 illustrates a system view of one embodiment of robot 18 for use in the above described order fulfillment warehouse application. Robot system 614 comprises data processor 620, data storage 630, processing modules 640, and sensor support modules 660. Processing modules 640 may include path planning module 642, drive control module 644, map processing module 646, localization module 648, and state estimation module 650. Sensor support modules 660 may include range sensor module 662, drive train/wheel encoder module 664, and inertial sensor module 668.

Data processor 620, processing modules 640 and sensor support modules 660 are capable of communicating with any of the components, devices or modules herein shown or described for robot system 614. A transceiver module 670 may be included to transmit and receive data. Transceiver module 670 may transmit and receive data and information to and from a supervisor system or to and from one or other robots. Transmitting and receiving data may include map data, path data, search data, sensor data, location and orientation data, velocity data, and processing module instructions or code, robot parameter and environment settings, and other data necessary to the operation of robot system 614.

In some embodiments, range sensor module 662 may comprise one or more of a scanning laser, radar, laser range finder, range finder, ultrasonic obstacle detector, a stereo vision system, a monocular vision system, a camera, and an imaging unit. Range sensor module 662 may scan an environment around the robot to determine a location of one or more obstacles with respect to the robot. In a preferred embodiment, drive train/wheel encoders 664 comprises one or more sensors for encoding wheel position and an actuator for controlling the position of one or more wheels (e.g., ground engaging wheels). Robot system 614 may also include a ground speed sensor comprising a speedometer or radar-based sensor or a rotational velocity sensor. The rotational velocity sensor may comprise the combination of an accelerometer and an integrator. The rotational velocity sensor may provide an observed rotational velocity for the data processor 620, or any module thereof.

In some embodiments, sensor support modules 660 may provide translational data, position data, rotation data, level data, inertial data, and heading data, including historical data of instantaneous measures of velocity, translation, position, rotation, level, heading, and inertial data over time. The translational or rotational velocity may be detected with reference to one or more fixed reference points or stationary objects in the robot environment. Translational velocity may be expressed as an absolute speed in a direction or as a first derivative of robot position versus time. Rotational velocity may be expressed as a speed in angular units or as the first derivative of the angular position versus time. Translational and rotational velocity may be expressed with respect to an origin 0,0 (e.g. FIG. 1, 110) and bearing of 0-degrees relative to an absolute or relative coordinate system. Processing modules 640 may use the observed translational velocity (or position versus time measurements) combined with detected rotational velocity to estimate observed rotational velocity of the robot.

In some embodiments, robot system 614 may include a GPS receiver, a GPS receiver with differential correction, or another receiver for determining the location of a robot with respect to satellite or terrestrial beacons that transmit wireless signals. Preferably, in indoor applications such as the warehouse application described above or where satellite reception is unreliable, robot system 614 uses non-GPS sensors as above and techniques described herein to improve localization where no absolute position information is reliably provided by a global or local sensor or system.

In other embodiments, modules not shown in FIG. 19 may comprise a steering system, braking system, and propulsion system. The braking system may comprises a hydraulic braking system, an electro-hydraulic braking system, an electro-mechanical braking system, an electromechanical actuator, an electrical braking system, a brake-by-wire braking system, or another braking system in communication with drive control 644. The propulsion system may comprise an electric motor, a drive motor, an alternating current motor, an induction motor, a permanent magnet motor, a direct current motor, or another suitable motor for propelling a robot. The propulsion system may comprise a motor controller (e.g., an inverter, chopper, wave generator, a multiphase controller, variable frequency oscillator, variable current supply, or variable voltage supply) for controlling at least one of the velocity, torque, and direction of rotation of the motor shaft of the electric motor. Preferably, drive control 644 and propulsion system (not shown) is a differential drive (DD) control and propulsion system. In a DD control system robot control is non-holonomic (NH), characterized by constraints on the achievable incremental path given a desired translational and angular velocity. Drive control 644 in communication with propulsion system may actuate incremental movement of the robot by converting one or more instantaneous velocities determined by path planning module 642 or data processor 620.

One skilled in the art would recognize other systems and techniques for robot processing, data storage, sensing, control and propulsion may be employed without loss of applicability of the present invention described herein.

Maps

Figure 20:
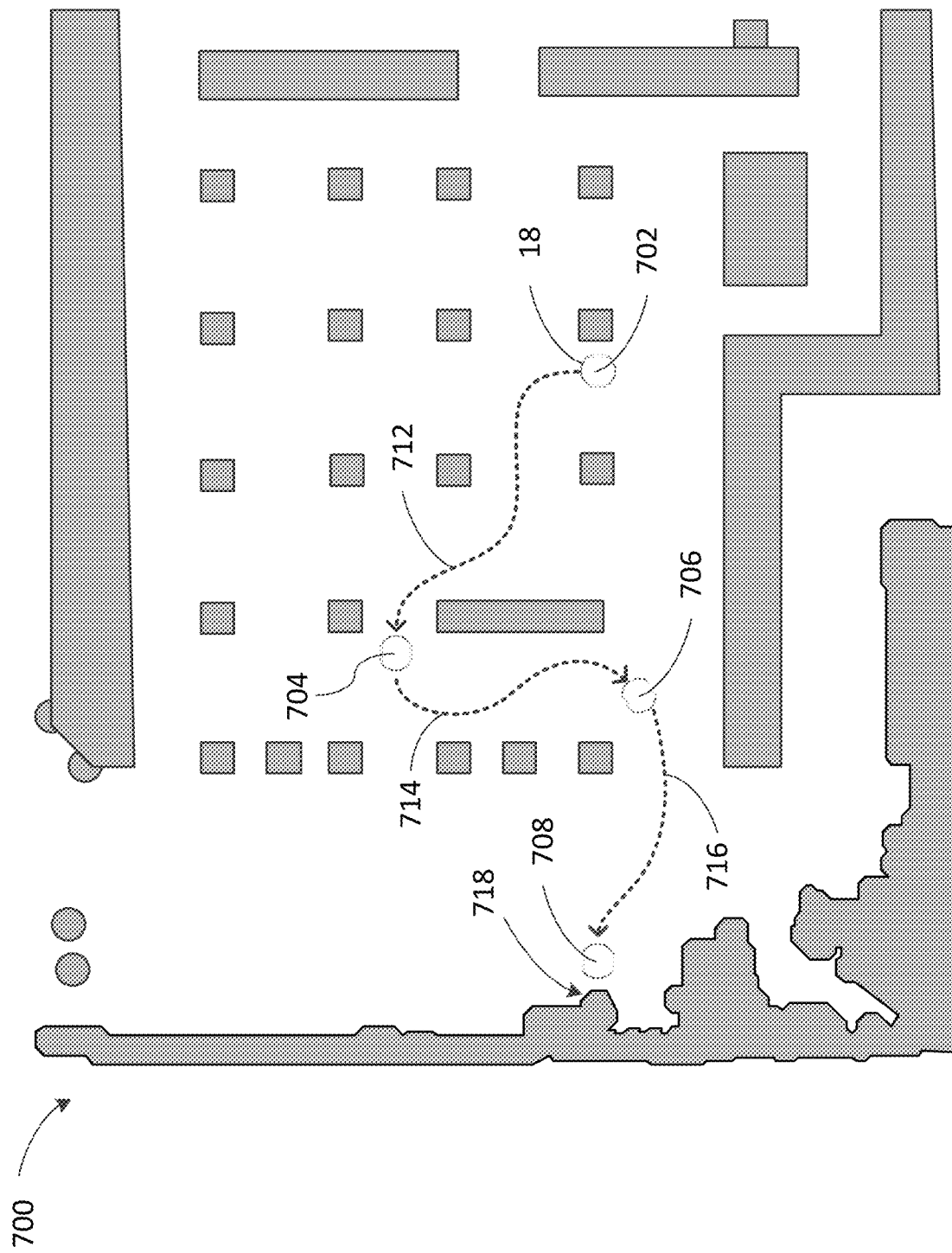
FIG. 20 depicts navigation of a robot from a current location to a target location through a warehouse environment represented by a spatial map.

Navigation by an autonomous or semi-autonomous robot requires some form of spatial model of the robot's environment. Spatial models may be represented by bitmaps, object maps, landmark maps, and other forms of two- and three-dimensional digital representations. A spatial model of a warehouse facility, as shown in FIG. 20 for example, may represent a warehouse and obstacles such as walls, ceilings, roof supports, windows and doors, shelving and storage bins. Obstacles may be stationary or moving, for example, such as other robots or machinery operating within the warehouse, or relatively fixed but changing, such as temporary partitions, pallets, shelves and bins as warehouse items are stocked, picked and replenished.

Spatial models in a warehouse facility may also represent target locations such as a shelf or bin marked with a fiducial to which a robot may be directed to pick product or to perform some other task, or to a temporary holding location or to the location of a charging station. For example, FIG. 20 depicts the navigation of robot 18 from a starting location 702 to intermediate locations 704,706 to destination or target location 708 along its path 712,714,716. Here the spatial model captures features of the environment through which the robot must navigate, including features of a structure at a destination 708 which may be a shelf or bin or a robot charging station.

Figure 21:
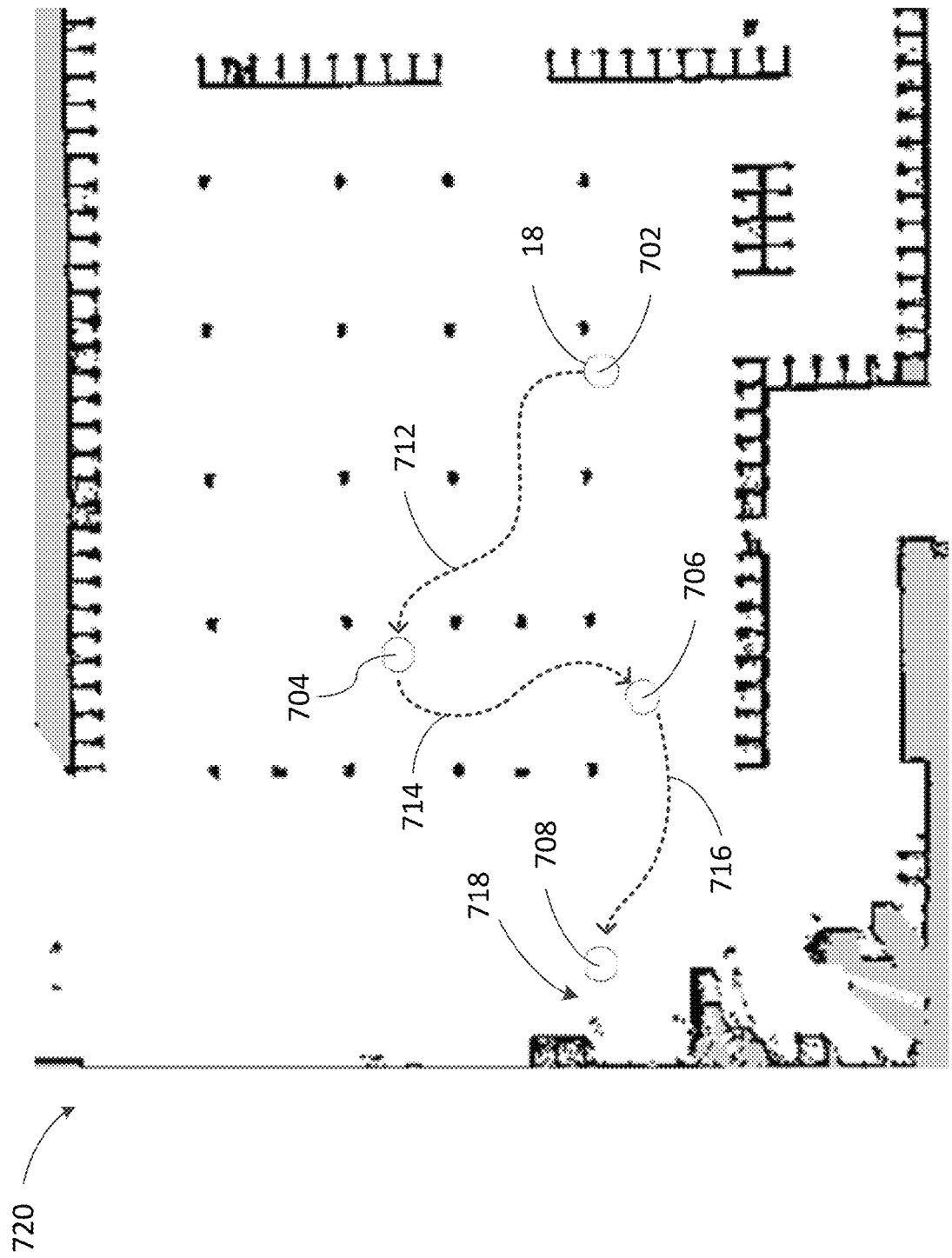
FIG. 21 depicts navigation of a robot in a warehouse environment represented by a SLAM map, according to one aspect of the invention.

The spatial model most commonly used for robot navigation is a bitmap of an area or facility. FIG. 21, for example, depicts a portion of a two-dimensional map for the areas shown in the spatial model of FIG. 20. Map 720 may be represented by bitmaps having pixel values in a binary range 0,1, representing black or white, or by a range of pixel values, for example 0-255 representing a gray-scale range of black (0) to white (255) or by color ranges, the ranges of which may depict uncertainties in whether a feature is present at the location represented by the pixel values. As shown in FIG. 21, for example, pixels in black (0) represent obstacles, white (255) pixels represent free space, and areas of solid gray (some value between 0 and 255, typically 128) represent unknown areas.

The scale and granularity of map 720 shown in the FIG. 21 may be any such scale and dimensions as is suitable for the range and detail of the environment. For example, in the some embodiments of the present invention, each pixel in the map may represent 5 square centimeters ($cm^2$). In other embodiments each pixel may represent a range from 1 $cm^2$ to 5 $cm^2$. However, the spatial resolution of a map for use with the present invention may be larger or smaller without loss of generality or benefit to the application of its methods. As further described below, in a preferred embodiment, while docking the robot to a charging station the resolution of the map may represent 1 $cm^2$ to provide the required precision navigation.

As depicted in FIG. 21, map 720 may be used by the robot to determine its pose within the environment and to plan and control its movements along path 712,714,716, while avoiding obstacles. Such maps may be "local maps", representing spatial features in the immediate vicinity of the robot or target location, or "global maps", representing features of an area or facility encompassing the operating range of one or more robots. Maps may be provided to a robot from an external supervisory system or a robot may construct its map using onboard range finding and location sensors. One or more robots may cooperatively map a shared environment, the resulting map further enhanced as the robots navigate, collect, and share information about the environment.

In some embodiments the supervisory system may comprise a central server performing supervision of a plurality of robots in a manufacturing warehouse or other facility, or the supervisory system may comprise a distributed supervisory system consisting of one or more servers operating within or without the facility either fully remotely or partially without loss of generality in the application of the methods and systems herein described. The supervisory system may include a server or servers having at least a computer processor and a memory for executing a supervisory system and may further include one or more transceivers for communicating information to one or more robots operating in the warehouse or other facility. Supervisory systems may be hosted on computer servers or may be hosted in the cloud and communicating with the local robots via a local transceiver configured to receive and transmit messages to and from the robots and the supervisory system over wired and/or wireless communications media including over the Internet.

One skilled in the art would recognize that robotic mapping for the purposes of the present invention could be performed using methods known in the art without loss of generality. Further discussion of methods for robotic mapping can be found in Sebastian Thrun, "Robotic Mapping: A Survey", Carnegie-Mellon University, CMU-CS-02-111, February, 2002, which is incorporated herein by reference.

Scans

A robot outfitted with sensors, as described above, can use its sensors for localization as well as contribute to the building and maintenance of the map of its environment. Sensors used for map building and localization may include light detection and ranging ("LIDAR" or "laser scanning" or "laser-radar") sensors. Laser-radar scanners measure the range and distance to objects in a horizontal plane with a series of discrete, angular sweeps of the robot's local environment. A range finding sensor acquires a set of measurements, a "scan" taken at discrete angular increments of preferably one-quarter (0.25) degree increments over a 180-degree arc or a greater or lessor degree arc, or a full 360-degree arc about the robot. A laser-radar scan, for example, may be a set of measurements representing the return time and strength of a laser signal, each measurement at a discrete angular increment indicating a potential obstacle at a distance from the robot's current position.

Figure 22B:
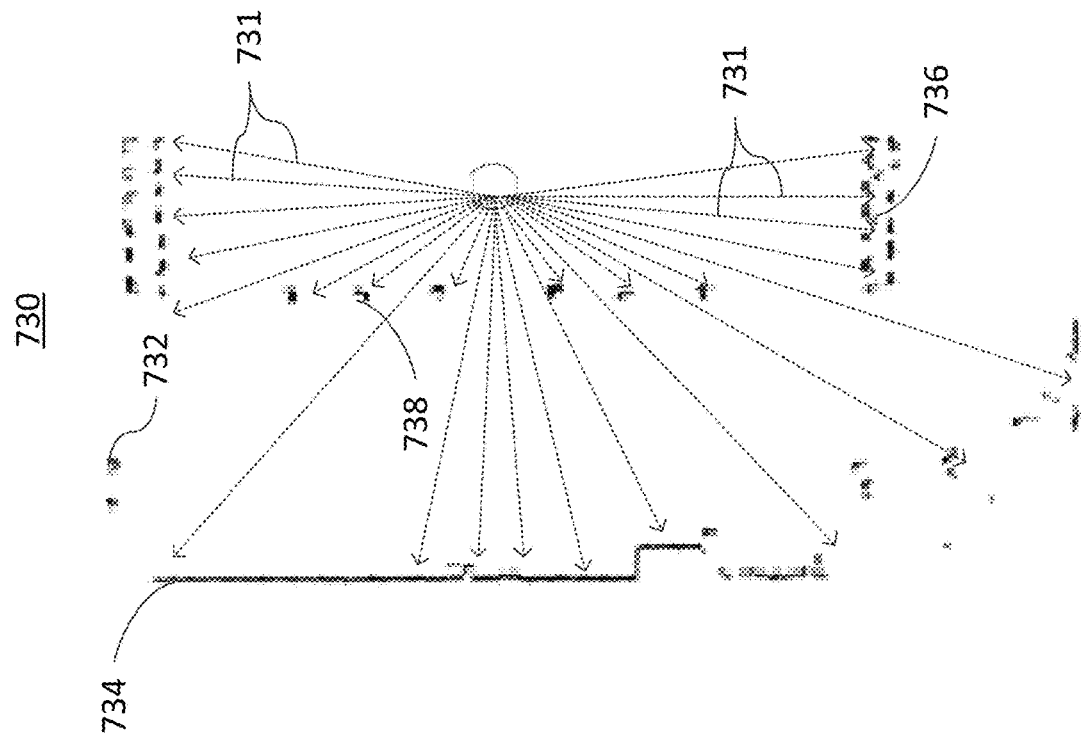
FIGS. 22A and 22B depict acquiring a range finding by a local scan from a robot's laser-radar scanner at a location within the spatial environment.
Figure 22A:
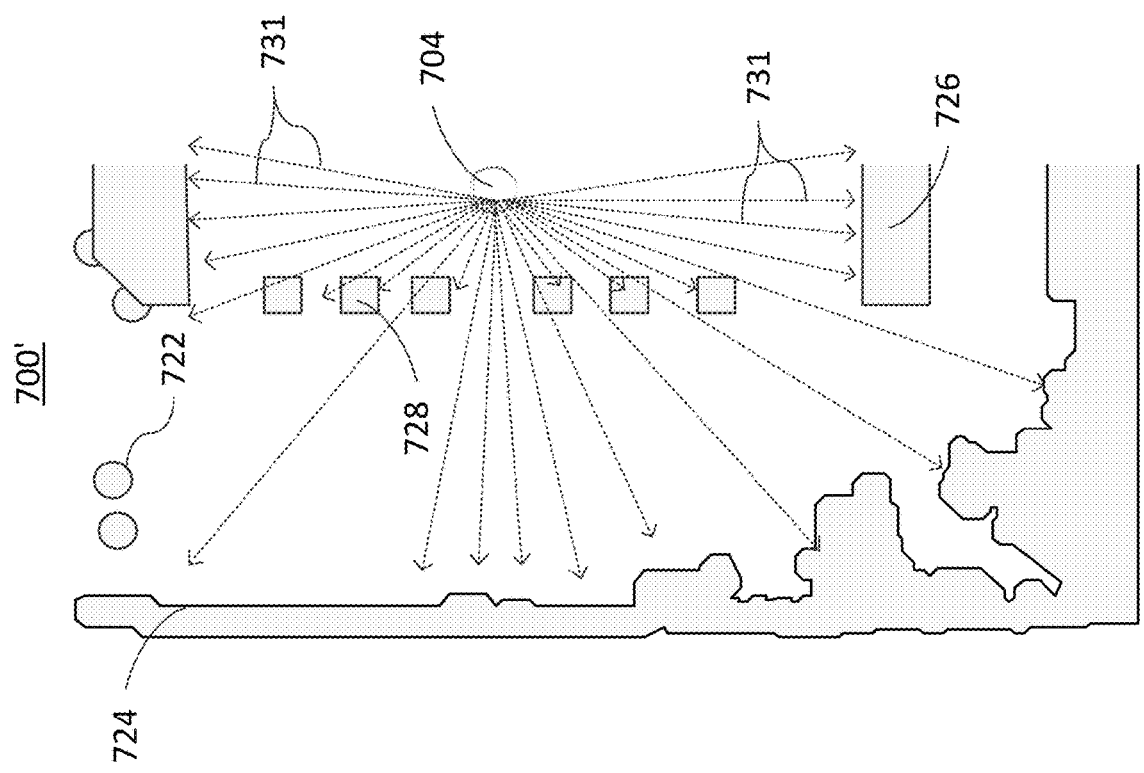

For illustration, as shown in FIGS. 22A and 22B, a laser-radar scan taken at location 704 can be represented graphically as a two-dimensional bitmap 730. Scan 730 as shown depicts an approximately 180-degree horizontal arc facing in the direction of travel of the robot at intermediate pose 704. Individual laser-radar measurements 731, depicted by directional broken lines, detect obstacles in the robot's environment 700', for example, at structures 722, 724, 726, and 728. These are represented by pixels at 732, 734, 736, and 738 in scan 730. In some embodiments, scans of straight walls 724 may be "filled in" in scan 730 where a connected geographic structure 734 may be known from other data or discernable by alignment of point cloud pixels.

Other forms of range finding sensors include sonar, radar, and tactile sensor without departing from the scope of the invention. Examples of commercially available range finding and location and orientation sensors suitable for use with the present invention include, but are not limited to, the Hokuyo UST-10LX, the SICK LMS 100, and the Velodyne VLP-16. A robot may have one or more range or location sensors of a particular type, or it may have sensors of different types, the combination of sensor types producing measurements that collectively map its environment. Further discussion of methods of robotic mapping by LIDAR and other scanners can be found in Edwin B. Olson, "Robust and Efficient Robotic Mapping", PhD Dissertation, Carnegie-Mellon University, 2008, which is incorporated herein by reference.

Scan Matching

Figure 23B:
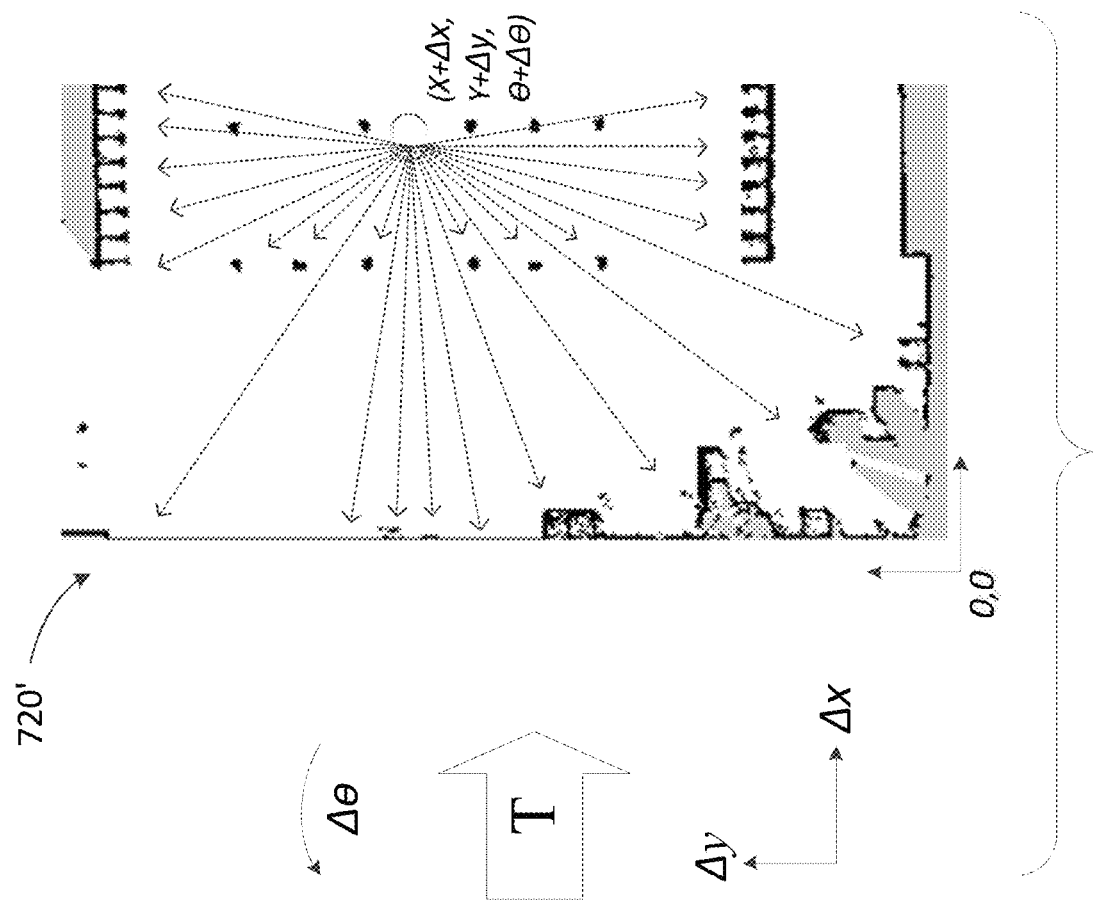
FIGS. 23A and 23B illustrates scan matching to find the pose of a robot using the translation of a misaligned scan to an aligned scan to determined current pose.
Figure 23A:
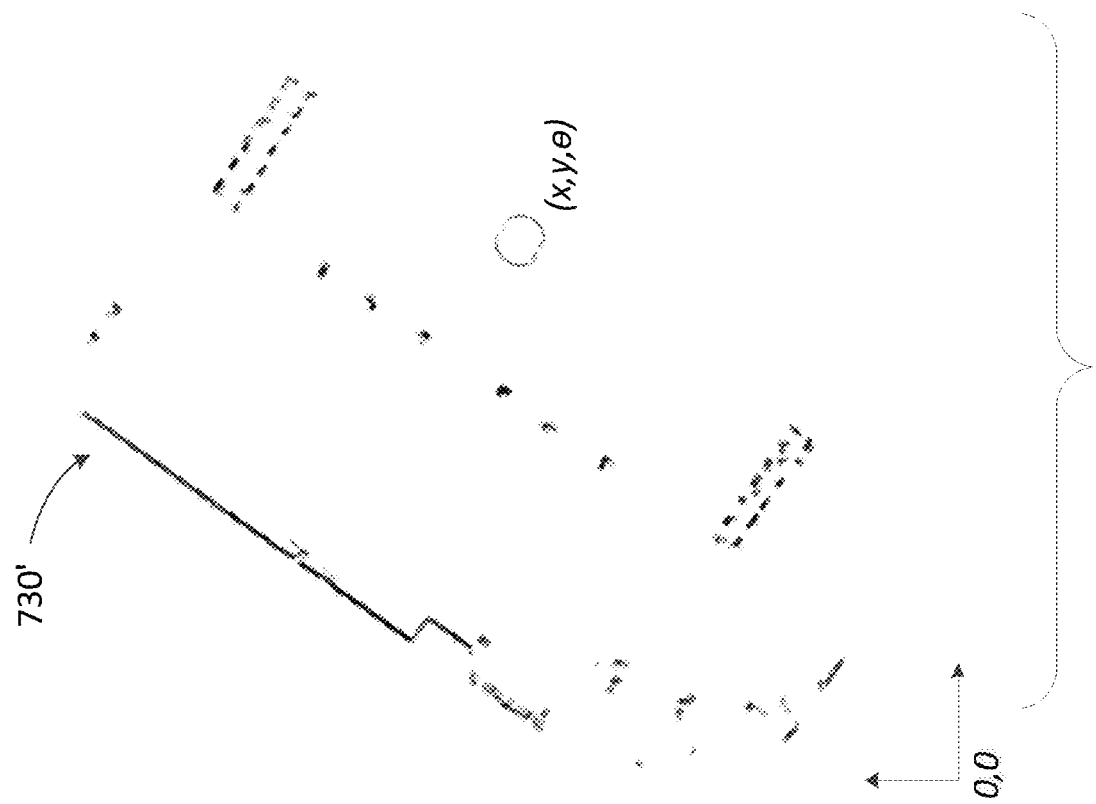

"Scan matching" is the process of comparing range finding scans by different robots or scans of a single robot taken at different times or to a map of an environment such as a SLAM map. In the scan-to-scan matching process, a first laser-radar scan taken by a robot at one time may be compared to a second, earlier scan to determine if the robot has returned to the same location in the map. Likewise, matching the scan to a second robot's scan can determine if the two robots have navigated to a common location in the map. Scan matching to a map can be used to determine the pose of the robot in the mapped environment. As illustrated in FIG. 23A, scan 730' is depicted as translated and rotated relative to map portion 720'. For a robot at an unknown pose (x, y, θ), matching the robot's laser-radar scan to map 720' finds the rigid body transformation T with translation Δx,Δy and rotation Δθ that causes scan 730' to correlate most strongly to map 720'. Thus, the correct pose of the robot (x+Δx, y+Δy, θ+Δθ) relative to a portion of map 720 as depicted by FIG. 23B can be determined.

It is unlikely that a laser-radar scan matches exactly with the map at any arbitrary location and orientation. Uncertainties in sensor measurements, the demands of pose accuracy, and limited computational cycle times require robust and efficient algorithms to statistically determine the best scan match between a robot's sensed environment and its actual pose. Statistical methods, however, are susceptible to producing inaccurate poses and can be computationally expensive.

Various methods and algorithms have been developed to address these complexities. A survey of scan matching techniques and a two-resolution method for ensuring accuracy while reducing computational complexity in scan matching for localization can be found in Edwin B. Olson, "Real-Time Correlative Scan Matching", in Proceedings of the 2009 IEEE international Conference on Robotics and Automation (ICRA'09), IEEE Press, Piscataway, N.J., USA, 2009, pp. 1233-1239, which is incorporated herein by reference.

M3RSM

As previously mentioned, another such technique for localizing using scan matching is many-to-many multiresolution scan matching or "M3RSM". M3RSM extends the two-resolution correlative scan matching approach to multiple resolutions, using a pyramid of maps, each constructed by decimation for computational efficiency. A discussion of M3RSM can be found in Edwin Olson, "M3RSM: Many-to-many multi-resolution scan matching", Proceedings of the IEEE International Conference on Robotics and Automation (ICRA), June 2015, which is incorporated herein by reference. M3RSM dramatically reduces the processing time to perform scan matching against a SLAM map by eliminating candidate poses from consideration at lower resolutions of the map. Robot localization and navigation along a goal path to a goal pose is further improved by minimizing the M3SRM search space according to methods disclosed in related U.S. application Ser. No. 15/712,222, entitled MULTI-RESOLUTION SCAN MATCHING WITH EXCLUSION ZONES, filed on Sep. 22, 2017, and incorporated by reference in its entirety herein.

Navigating to a Charging Station

As shown and described with reference to FIGS. 17 and 18 above, robot 18 may navigate to a robot charging station to electrically mate with the charging station and initiate charging of the robot. For illustration, FIG. 20 depicts robot 18 moving along the path 712,714,716, proceeding from a current location 702 through locations 704,706 to a target location 708. Target location 708 may be the location of the robot having arrived at a pose in front of a charging station (not shown), which may be located at approximately location 718. Upon arriving at location 708, the robot may begin a more precise docking navigation to position itself to cause the electrical charging port 300 to mate with the electrical charging assembly 200. Robot 18 is then docked at charging station 500 and ready for recharging.

Figure 24:
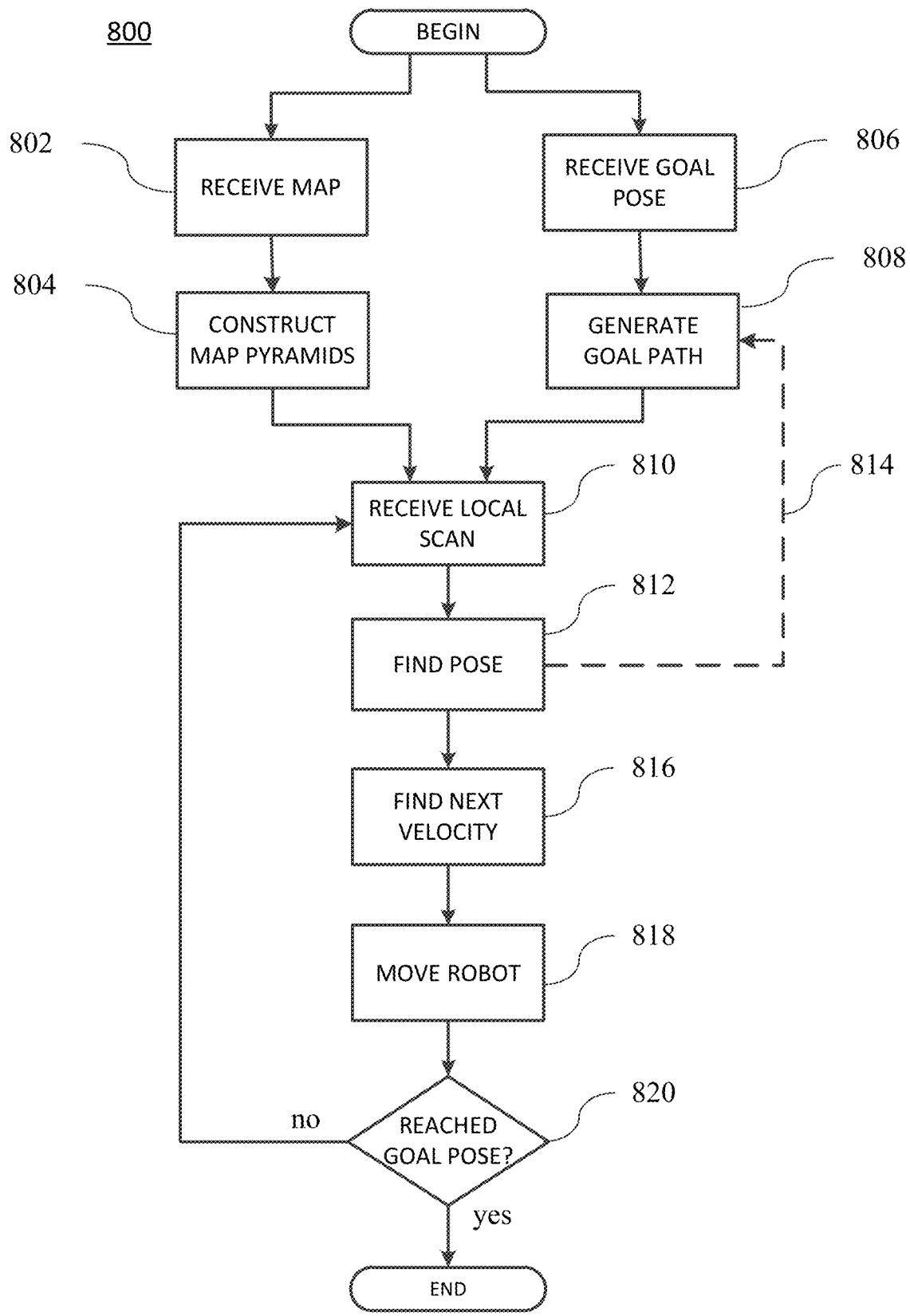
FIG. 24 illustrates a method for navigating a robot to move the robot along a goal path, according to one aspect of the invention.

During navigation of the robot to the charging station, the robot may navigate to location 708 as it would for any other target pose associated with a target product bin or fiducial as above described. FIG. 24 illustrates one such process for moving the robot along a goal path from a current location to a goal pose, which may be the pose of the charging station. Beginning at step 802, robot system 614 receives a SLAM map via transceiver module 670 representing the map of the robot environment. Alternatively, the map may be subsequently retrieved from data storage 630, by data processor 620 or by map processing module 646. As depicted in FIG. 21, map 720 may represent a portion of a warehouse containing free space and obstacles. Pixel values of map 720 in a binary range of 0,1 represent obstacles (0 or black) and free space (1 or white). Alternatively, map 720 may represent obstacles within the warehouse using pixel values in a range of 0-255, with values of zero (0) representing obstacles and 255 indicating free space. Gray pixels, if any, typically having value 128 represent unknown or unmapped or inaccessible areas. Upon receipt of the map, at step 804, map processing module 646 may construct map pyramids according to M3RSM or, preferably, according to the improved M3RSM techniques as referenced and incorporated above. Constructing map pyramids for use with M3RSM is further described in the aforementioned U.S. application Ser. No. 15/712,222, previously incorporated by reference above.

Continuing with navigation process 800, at step 806 the robot, using robot system 614, receives a goal pose, for example the pose 600 of a charging station 500 at location 718. At step 808, robot system 614 then generates, using path planning module 646, the goal path from its initial pose to the pose associated with the charging station. The goal path may then be stored for later processing. In some embodiments, the goal path may be generated based on a pose estimate for the robot, or, preferably, generating the goal path is based on the pose of the robot determined after the first iteration of the "Find Pose" step 812. Path planning module 642 may generate the goal path from the current pose to the goal pose by a variety of techniques known to practitioners in the art including the A* and D* pathfinding algorithms. Alternatively, the robot may receive a goal path via transceiver module 670 or may retrieve a goal path from data storage 630. Having received the map and generated the map pyramids and goal path, robot system 614 may then proceed to move the robot incrementally along the goal path.

At step 810, the robot receives a laser-radar scan of the local environment and proceeds to find the pose best matching the received scan. As illustrated above with reference to FIG. 22A, the local scan may consist of a laser-radar "point cloud" representing points in the field of view of the robot at which obstacles are detected by the laser-radar. The point cloud may represent points of the laser-radar scan at a position and orientation relative to the robot, each point in the point cloud taken at a discrete angular increment and indicating a potential obstacle at a distance from the robot's current position.

At step 812, "Find Pose", the current pose of the robot is found. First, a search area is determined as the portion of the received map to be searched for candidate poses. In a first iteration, the search area may include the entire map. In a subsequent iteration, the robot may estimate its pose within only a portion of the map. The pose for determining the search area may be estimated from a last known pose combined with sensor data such as drive train/wheel encoders and/or drive control information. One skilled in the art would understand that estimates of pose and determining the search area could be performed by various methods and parameters. In a preferred embodiment, state estimation module 650 may fuse pose data with wheel encoder data and inertial sensor data to determine the robot's current pose, velocity, and estimated errors for each. The estimated pose thus bounds the search to a portion of the map, reducing the search space and decreases processing time for scan matching. The lower the uncertainty in the pose estimate, the smaller the search area over which scan matching may be required. The larger the uncertainty, the greater the search area over which scan matching may be required. Next, the pose within the search area is determined by scan matching according to scan matching techniques such as M3RSM as referenced above. At optional step 814, the process may return to step 808 to generate or update the goal path based on a first or subsequent find pose result.

Having found the current pose of the robot, continuing to step 816 of FIG. 24, the robot calculates an instantaneous next velocity for moving the robot along the goal path. Preferably, instantaneous velocity along the goal path in the presence of other robots and obstacles is achieved by methods including, but not limited to, the dynamic window approach (DWA) and optimal reciprocal collision avoidance (ORCA). In a preferred embodiment, DWA computes among feasible robot motion trajectories an incremental movement that avoids collisions with obstacles and favors the desired goal path to the target location. Upon determining a next velocity (step 816) and robot movement (step 818), robot system 614 repeats if the goal pose is not yet reached (step 820), obtaining of a new local scan (step 810), finding pose (step 812) and next velocity (step 816) until the goal pose is reached (step 820). Navigation thus proceeds as a series of incremental movements along incremental trajectories determined by the instantaneous velocity at each processing cycle.

Where the goal path includes at a goal pose that is the pose assigned to a charging station, the process may continue with precision docking as follows.

Precision Docking with High Resolution Localization

Figure 25:
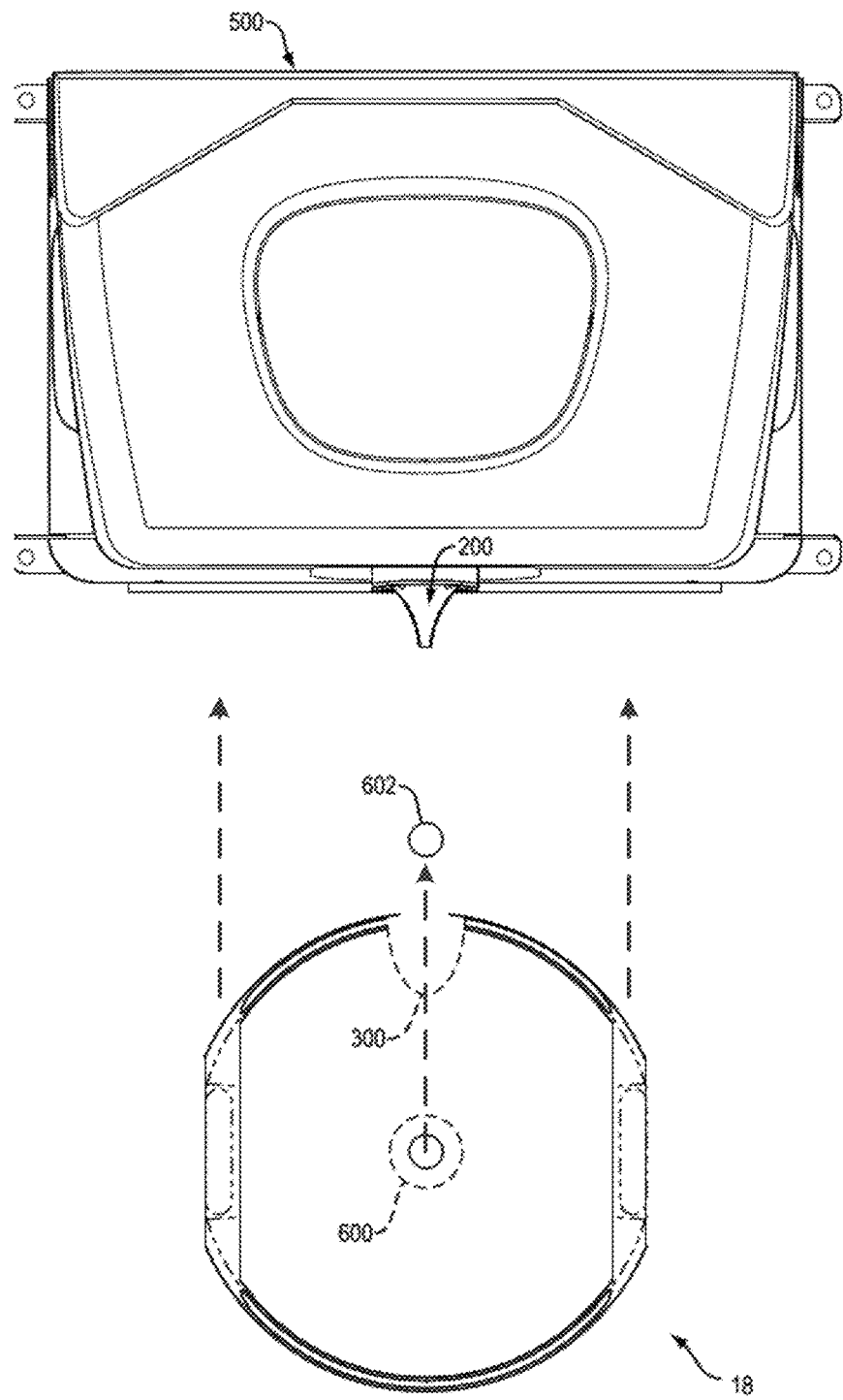
FIG. 25 depicts the docking of the robot to the charger docking station according one embodiment of docking using higher resolution localization.

FIG. 25 depicts the robot 18 after navigating to the pose 600 assigned to the charger docking station, its structure being more fully shown and described above. As an alternative to camera-based fiducial docking, as described above with respect to FIGS. 17 and 18, navigation of the robot 18 from pose 600 to mating pose 602 may employ scan matching techniques according to navigation methods described above for navigating from a current pose, at a location in a warehouse for example, to the initial pose 600 associated with a charging station.

Mating the electrical charging assembly and electrical charging port, according to the above-disclosed dimensions of one embodiment of the electrical charging assembly and electrical charging port, may require higher resolution maps than the maps used for warehouse navigation. That is, the navigation approach used by the robot to arrive at pose 600, which may use 5 cm-resolution maps, for example, may not precisely position the robot at mating pose 602, such that the electrical charging assembly 200 of charging station 500 and the electrical charging port 300 of robot 18 are reliably mated. Using the 5-cm resolution for localization and scan matching may also require that the charging station be perfectly mapped and firmly fixed to the warehouse floor.

Thus, in an embodiment of precision docking, upon arriving at pose 600 of charging station 500 the robot 18 may switch to using a higher resolution SLAM map of the environment, preferably a 1 cm-resolution SLAM map, and localizing by scan matching techniques as described above. Localization using a higher resolution map, such as a 1 cm-resolution map, may proceed as described with reference to process 830 of FIG. 26. Process 830 proceeds by receiving a map (at step 832) of the warehouse environment at a higher resolution than the map of the environment used in navigating from a location in the warehouse to initial pose 600. Robot system 614 using map processing module 646 may then construct map pyramids (step 834) according to M3RSM or, preferably, according to the improved M3RSM techniques as referenced and incorporated above.

Figure 26:
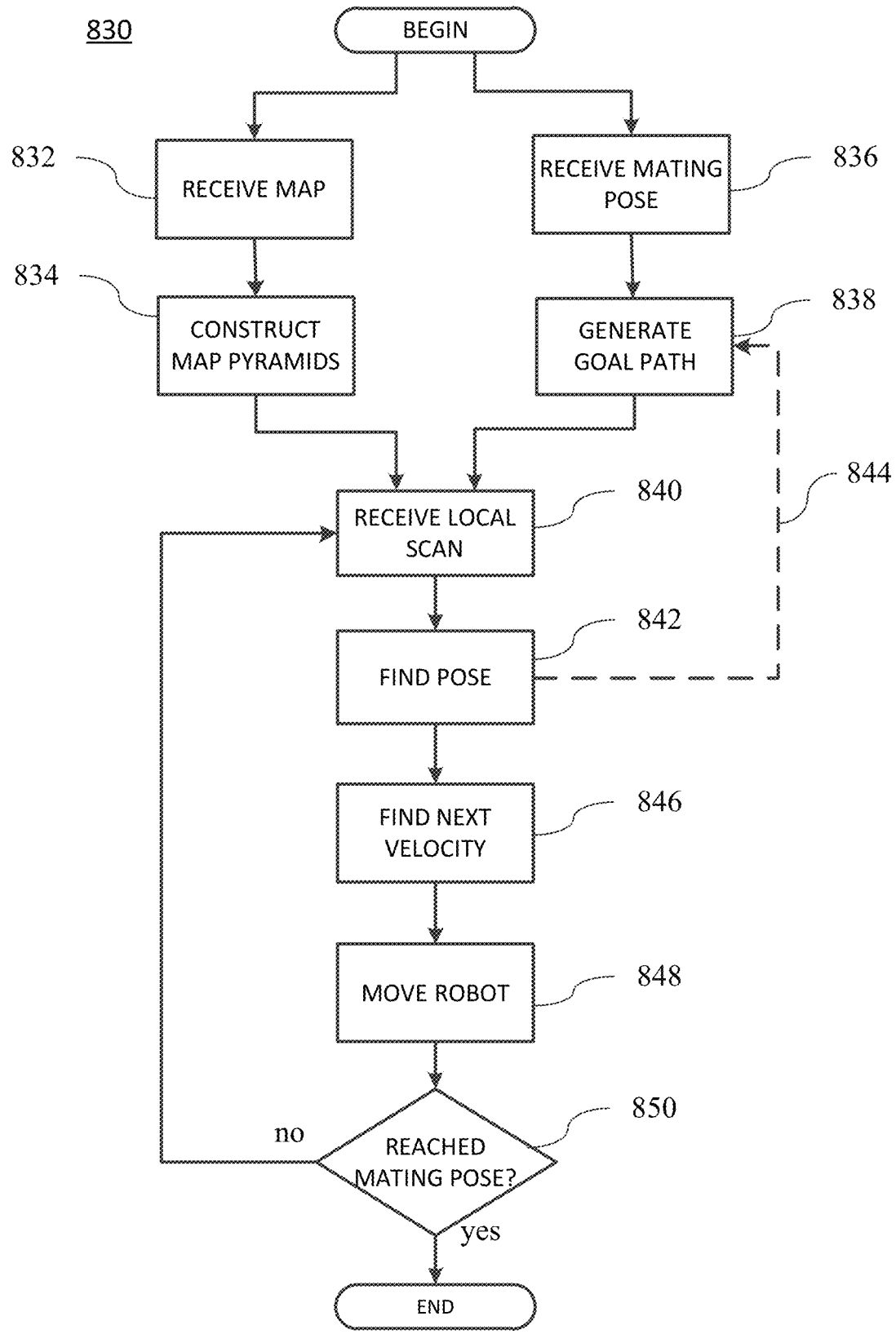
FIG. 26 depicts the docking of the robot to the charger docking station according to an alternative embodiment of precision docking using higher resolution localization.
Figure 27:
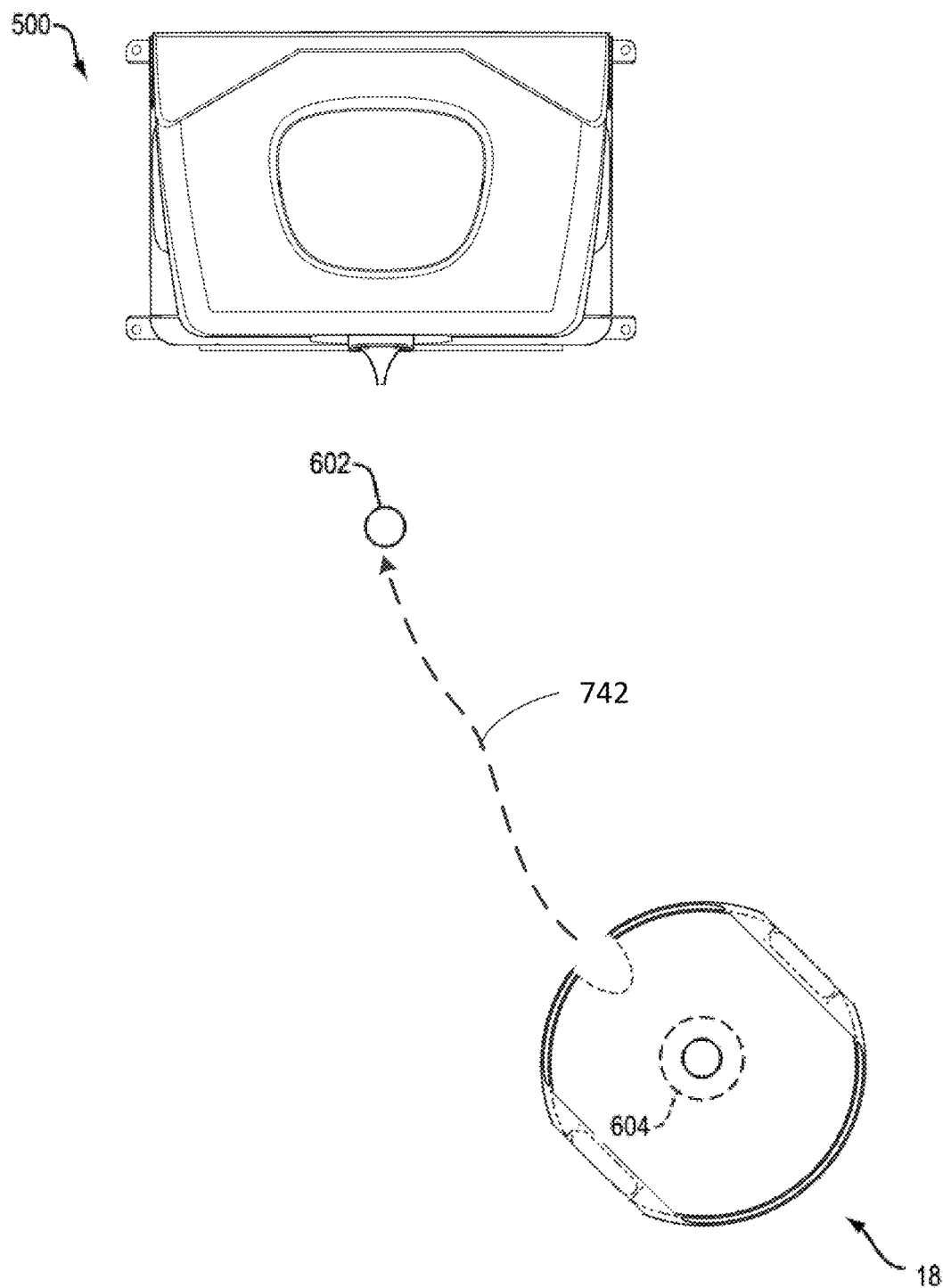
FIG. 27 illustrates a method of navigating a robot to move the robot from an initial pose in proximity to a charger docking station to a mating pose of the docking station, according to one aspect of precision docking.

At step 836, FIG. 26, the received pose is the mating pose 602 of the charging station. Generating the goal path at step 838 generates a goal path from the robot's current pose, initial pose 600, to the goal pose, mating pose 602. Steps 840, 842, 846, 848, and 850, FIG. 26, may then proceed as above described with reference to FIGS. 24 and 25. That is, robot 18 upon arriving at pose 600 moves forward from pose 600 to pose 602 by switching to using a 1 cm-resolution map of the warehouse and continuing with the navigation using the received map and goal path, thereby providing the more precise localization required to drive the robot to mate its electrical charging assembly and the electrical charging port of the charging station. In an alternative embodiment, recognizing that the initial pose of the robot need not be directly facing and center of the charging station, the robot 18 may instead navigate to an initial pose 604 in proximity to the charging station. As illustrated in FIG. 27, for example, robot 18 may first navigate from a warehouse location to initial pose 604 in proximity to charging station 500, and then, using precision navigation with a higher resolution map, preferably a 1 cm-resolution map, navigate as described above to mating pose 602 along path 742.

While providing for precision localization when docking to the charging station, using a higher resolution map adds computational complexity and robot system data processor and data memory resource demands. For example, the processing demands for localizing by scan matching on a 1 cm-resolution map demands as much as 25-times the computation of using a 5 cm-resolution map. Thus, making use of a higher resolution map for localization by scan matching during docking wastes processing time that could be used for other critical processing tasks. Furthermore, in the area of the charging station, the map of the entire warehouse is not needed once the robot is proximate to the charging station. Still more, navigation by scan matching to the entire warehouse map, assuming it includes a map of the charger docking station, would not be tolerant of movement of the charging station during docking.

Figure 28:
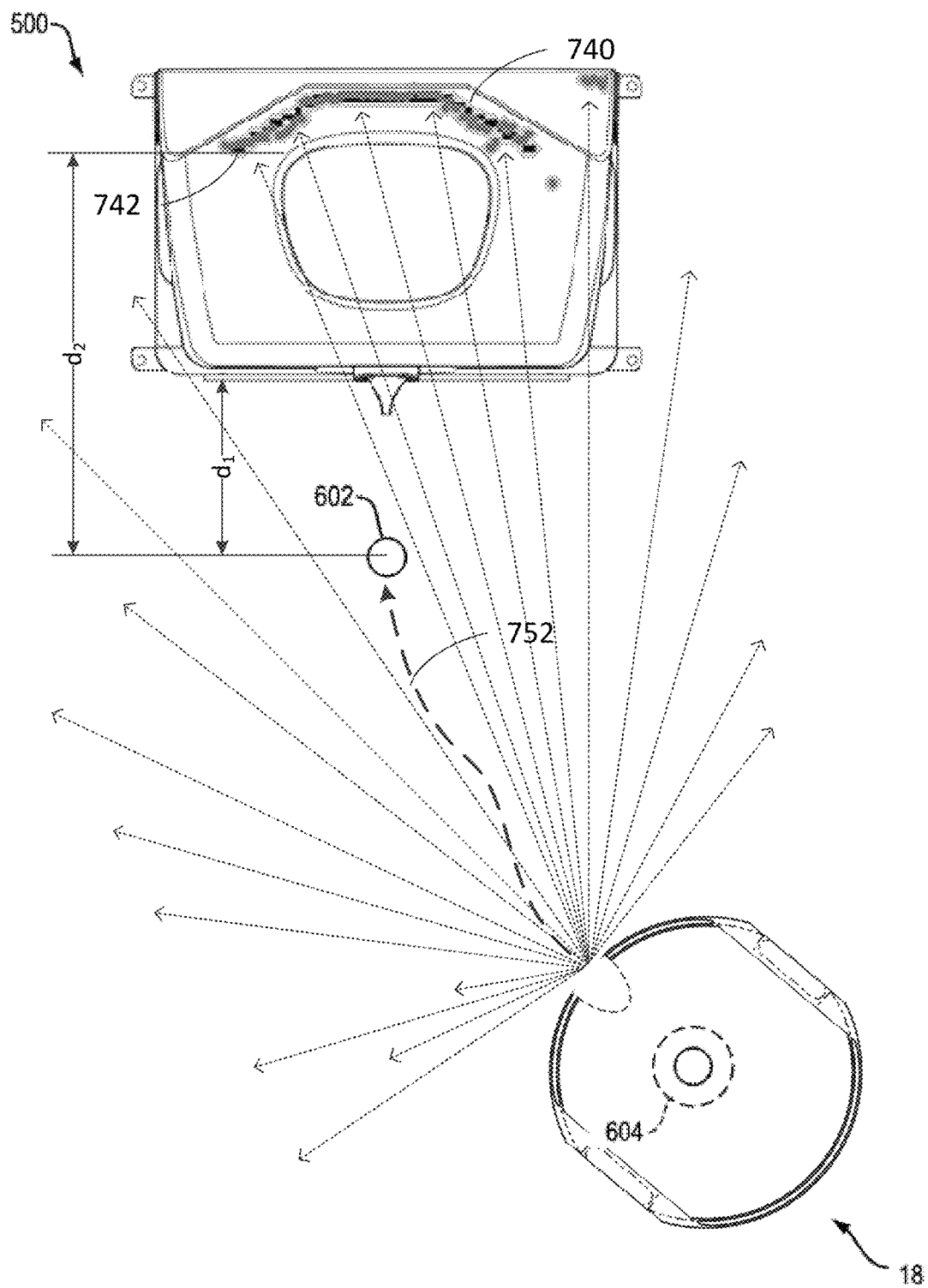
FIG. 28 depicts the docking of the robot to the charger docking station according to an embodiment of docking using scan matching.

Accordingly, FIG. 28 illustrates a further embodiment of precision docking using a higher resolution map for localization, where the received scan map contains only the charging station and scan matching of a local scan is performed on the higher resolution map. The map of the charging station may include a map at 1 cm-resolution, where pixels of the map represent the vertical surfaces of a charging station. Alternatively, the charging station map may be constructed from the known structure and dimensions of a charging station. Any such map may be used to represent the charging station as the charging station would be scanned by a robot's laser-radar scanner.

For example, as shown in FIG. 28, and with reference to FIG. 17, the charging station map 740 (shown in black) may be represented by a scan of the side panel surfaces 538 and 540 and center panel surface 536 of a charging station. Thus, the map used for scan matching to the charger docking station may be a higher resolution map 740 of the back portion of the docking station scanned at the level of the laser-radar 22 (see FIG. 2A). Similarly, the local scan for scan matching to the charging station map may be a laser-radar scan 742 (shown in red) of the angled side panels and center surfaces at the back of the charging station 500 scanned at the level of the laser-radar 22.

It is noted that the charging station, in other embodiments, may be in other dimensions and configurations, i.e. the side surfaces at the back of the docking station may not be angled relative to the center surface. Indeed, the methods described herein for docking a robot to a charging station may be applied to other dimensions and configurations of a charger docking station without loss of generality. With such other dimensions and configurations, the map of the charging station used for scan matching need only provide a scan map including or consisting solely of a scan or scan representation of a charger docking station that matches a range-finding scan of the robot. Such robots may use other range finding scanning methods consistent with producing a local scan for scan matching to the map of the charging station.

In view of the navigation process 830 described above with reference to FIG. 26, upon arriving at an initial pose 604 the robot may switch to navigating using a map of the charging station. The map received at step 832 in this embodiment may be a higher resolution map including only the charger docking station. Localization of the robot against a map of the charging station, using scan matching according to the above techniques, may proceed, preferably, employing M3RSM thus map pyramids in step 834, FIG. 26, may be constructed as referenced above. At step 836 the received pose is the mating pose of the charging station. Generating the goal path at step 838 generates a goal path from the robot's current pose, initial pose 600, to the goal pose, mating pose 602. Continuing with process 830, FIG. 26, the local scan received in step 840 for scan matching to the charging station map or "localizing to the dock" is, in one aspect, the laser-radar scan 742 of the charging station. As such, the laser-radar scan 742 of the charging station in FIG. 27 is used to find the pose (step 842) of the robot by scan matching against charging station map 740 at each iteration of process 830. Incremental movement of the robot from the initial pose 604 to the mating pose 602 proceeds with the next incremental velocity (step 846) causing robot 18 to move incrementally (step 848) along path 752. The process repeats (step 820) as the robot 18 moves incrementally along path 752 from the initial pose 604 to the mating pose 602, thereby mating the electrical charging assembly 200 with the electrical charging port 300, as shown in FIG. 17.

In one embodiment, obstacle avoidance during docking, when navigating from the initial pose to the mating pose, may be simplified by determining from each local scan, at each iteration, whether an obstacle exists within a threshold distance d, where d is less than the distance that the robot can get to the charger docking station when fully mated. An obstacle appearing in the local scan within distance d is thus not the docking station itself. For example, as shown in FIG. 26, a threshold distance $d_1$ may be measured from the mating pose to the front face of the charger docking station. Alternatively, threshold distance $d_2$ may be less than the distance to the vertical surfaces scanned at the level of the robot's laser-radar. In this aspect, upon detecting an obstacle within the threshold distance, robot 18 may stop and wait for the obstacle to clear or the robot may receive a new pose for continued navigation to another charging station or target location.

By localizing against the charging station only, the robot may perform precision docking at maximum efficiency for the short duration of the final approach to the charger docking station. Localizing against the charging station only may be used in conjunction with higher resolution maps while docking, and may be used with other robot control techniques, such as "arc control" to be further described below, without loss of generality as to the inventive aspects of "localizing to the dock."

Precision Docking with Arc Control

Figure 29:
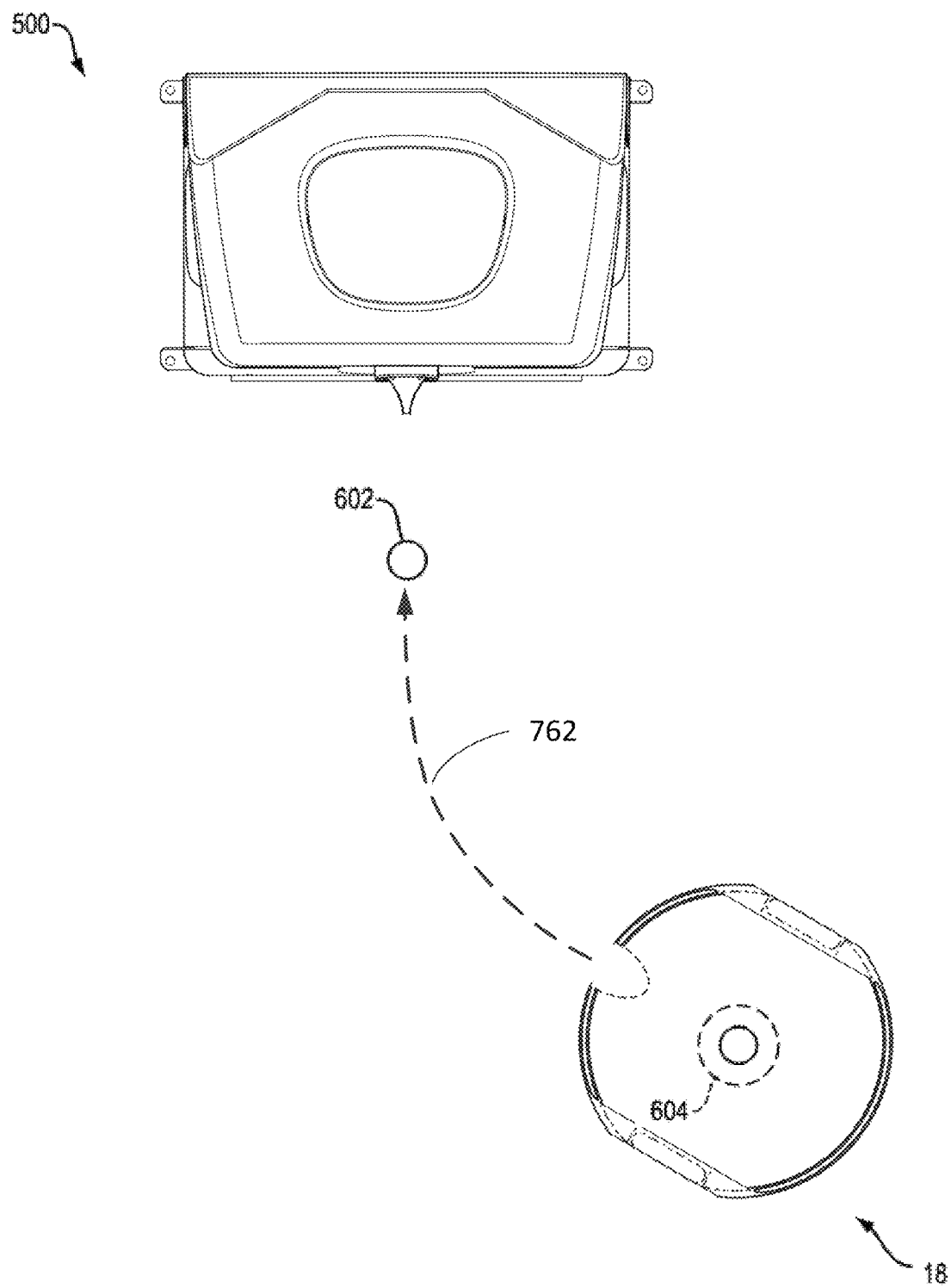
FIG. 29 depicts the docking of the robot to the charger docking station according to an embodiment of precision docking using arc control.

Precision docking according to the embodiments described above with reference to FIGS. 26 and 27 may not always move the robot along a path conducive to reliably engaging the electrical charging assembly with the electrical charging port. For example, robot 18 may navigate from pose 604 to pose 602 using higher resolution maps and scan matching to the charging station map only. However, upon the approach to mating pose 602, robot 18 may not be directly facing the charging station, which could result in unreliable mating. Thus, the mating of the robot to the charging station may be improved by navigating substantially along a controlled arc from the initial pose to the mating pose of the charging station. For example, as shown in FIG. 29, navigating along path 762 from pose 604 to pose 602 ensures that the robot's orientation is perpendicular to charging station 500 in its final approach to mating pose 602.

Figure 30:
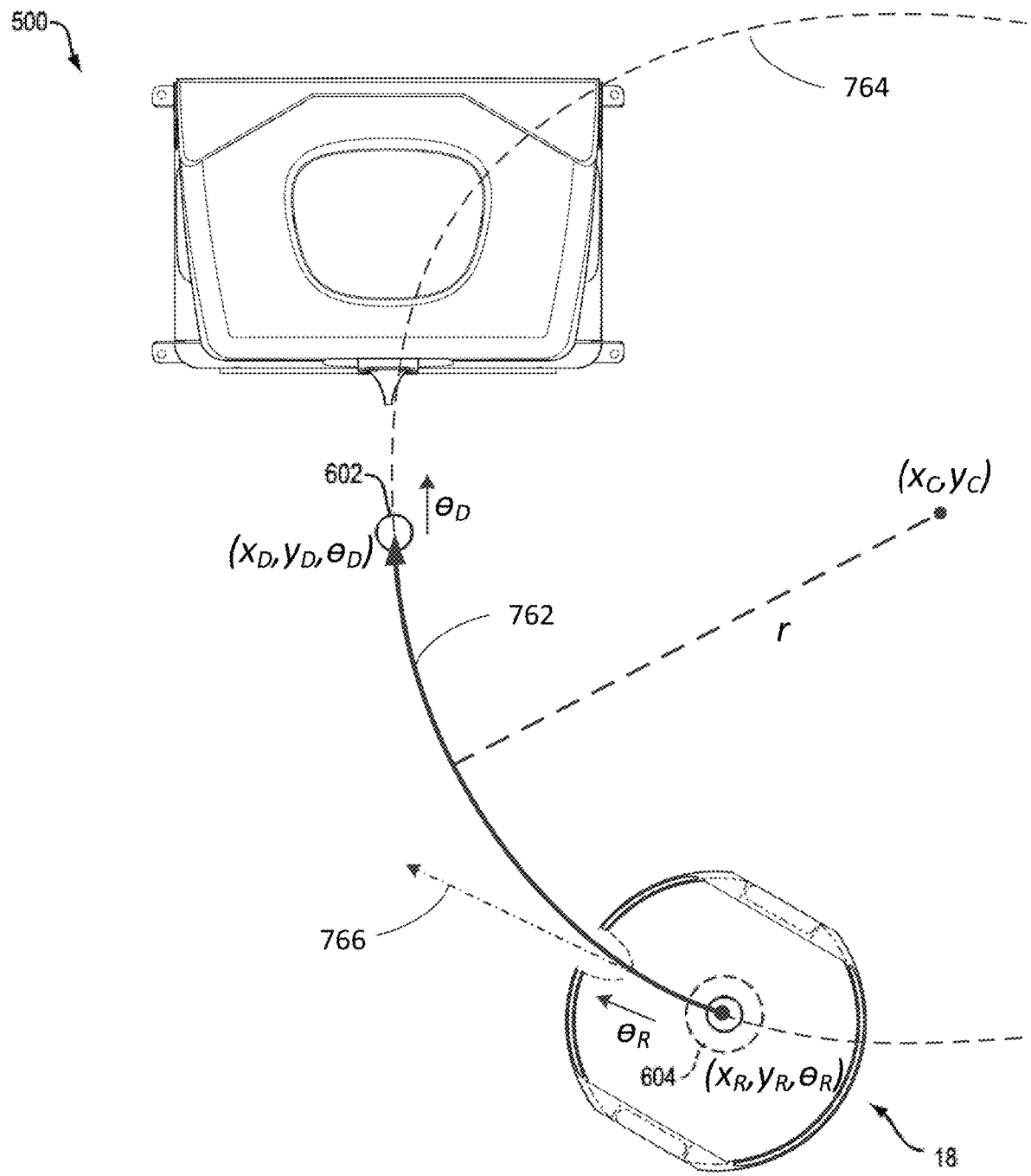
FIG. 30 illustrates one method of precision docking using arc control for docking the robot to the charger docking station, according to one embodiment of precision docking with error control.

FIG. 30 illustrates a preferred method of precision docking control by navigating substantially along an arc from an initial pose to a mating pose, thus orienting the robot perpendicular to the charging station. As shown in FIG. 30, initial pose 604 is identified by pose coordinates $X_R$, $Y_R$, $\theta_R$, where $X_R$, $Y_R$ is the current or initial location of the robot upon navigating in proximity to the charging station, and $\theta_R$ is the angular orientation of the initial pose. Mating pose 602 is identified by pose coordinates $X_D$, $Y_D$, $\theta_D$, where $X_D$, $Y_D$ is a location aligned with the electrical charging assembly or "snout" of the charging station, and the angular orientation $\theta_D$ of the mating pose is perpendicular to the charging station. Observing that an arc described by path 762 traces a section of a circle 764 with radius R and center $X_C$, $Y_C$ beginning at $X_R$, $Y_R$ and ending at $X_D$, $Y_D$, the first step in finding path 762 is to find the center $X_C$, $Y_C$ of the circle 764 that passes through $X_R$, $Y_R$ and $X_D$, $Y_D$.

Unfortunately, there are an infinite number of circles with radius r having an arc section passing through $X_R$, $Y_R$ and $X_D$, $Y_D$. By introducing the constraint that the tangent to the circle at pose $X_D$, $Y_D$ must have a slope of $\tan(\theta_D)$, i.e., the robot's final orientation is perpendicular to the charging station, and further utilizing the constraint that the center $X_C$, $Y_C$ of circle 764 will be the same distance from $X_R$, $Y_R$ and $X_D$, $Y_D$, radius r can be found as follows:

$$\sqrt{(x_D - x_C)^2 + (y_D - y_C)^2} = r \qquad (1)$$

$$\sqrt{(x_R - x_C)^2 + (y_R - y_C)^2} = r \qquad (2)$$

$$y_C - y_D = -\frac{1}{\tan(\theta_D)}(x_C - x_D) \qquad (3)$$

A third constraint provides that the equation of the line passing through $X_D$, $Y_D$ and $X_C$, $Y_C$ has a slope that is perpendicular to the tangent line slope of $\tan(\theta_D)$. Defining variable p as follows:

$$p = -\frac{1}{\tan(\theta_D)} \qquad (4)$$

and solving for $X_C$ and $Y_C$:

$$x_C = \frac{\frac{(x_R^2 - x_D^2)}{2} + \frac{(y_R^2 - y_D^2)}{2} + px_D y_R - px_D y_D - y_D y_R}{(x_R - x_D) + p(y_R - y_D)} \qquad (5)$$

$$y_C = p(x_C - x_D) + y_D \qquad (6)$$

provides for solving for radius r by simple substitution into equations (1) or (2) above.

As above, the radius r of the unique circle having center $X_C$, $Y_C$ passing through $X_R$, $Y_R$ and $X_D$, $Y_D$ defines the desired arc path 762 from pose 604 to mating pose 602. Thus, the control for an incremental movement of the robot along path 762 may be determined from the tangent line of the circle 764 at each iteration. That is, the control of the robot at each iteration may be found by advancing the robot in the direction of the tangent line at an instantaneous location x'$_R$, y'$_R$, at an angular velocity $\theta'_T$, where $\theta'_T$ is the tangent to the circle 764 at x'$_R$, y'$_R$.

Figure 31:
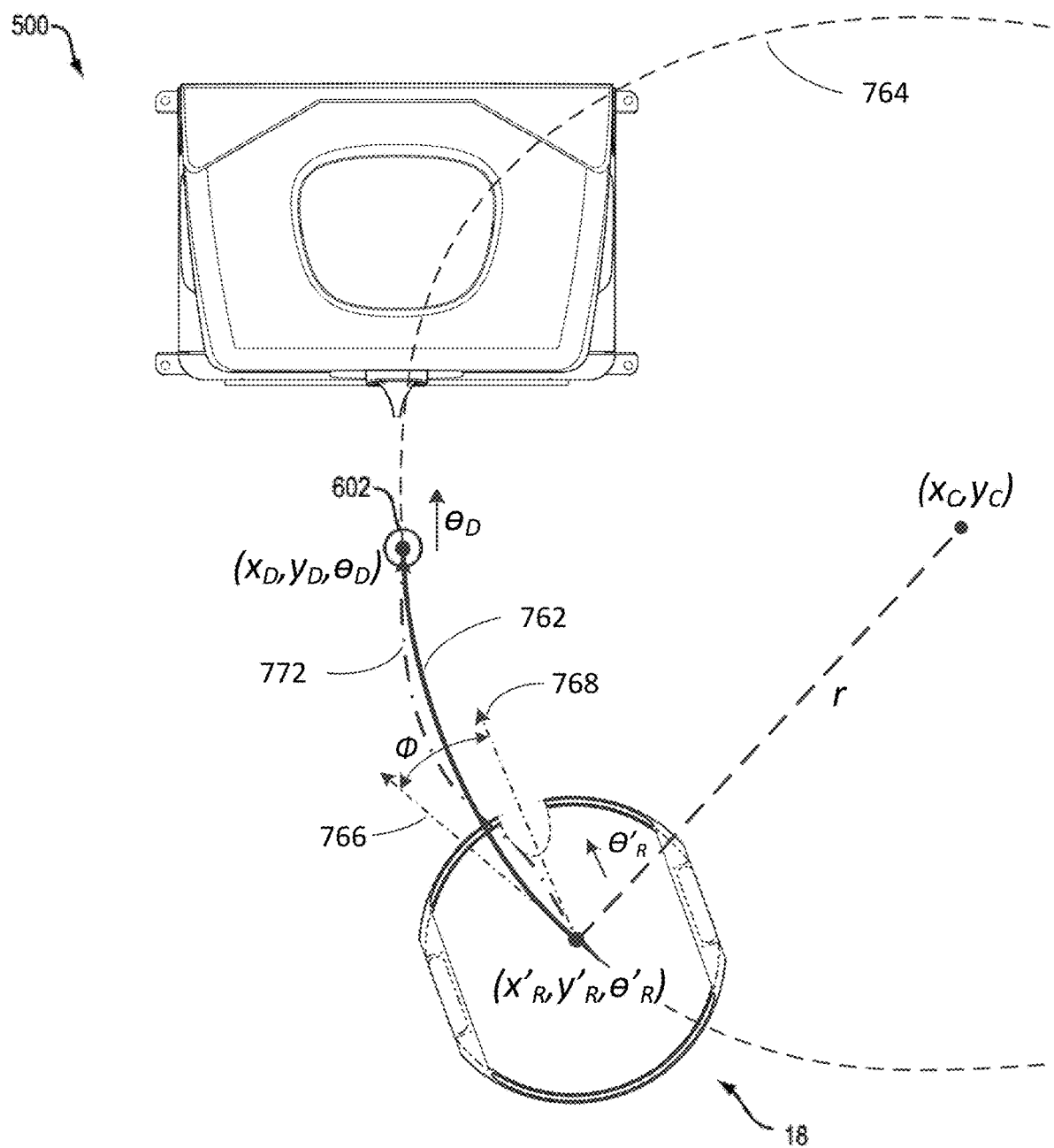
FIG. 31 illustrates one embodiment of precision docking using arc control for docking the robot to the charger docking station using precision docking with error control.

In practice, some variation in the actual path may occur as the robot moves incrementally from pose 604 to pose 602 along the control path 762. The instantaneous velocity of the robot at each incremental pose along path 762 should, however, result in an instantaneous trajectory within a small error from the control path. For example, FIG. 31 shows robot 18 advanced along path 772 (for clarify shown as an exaggerated variation from arc path 762) to pose x'$_R$, y'$_R$, $\theta'_R$, which may result in a small angular error Φ between the tangent line 766 of circle 764, at location x'$_R$, y'$_R$, and trajectory 768 extended in the direction of orientation $\theta'_R$. At each iteration and incremental movement, the radius r should not change. That radius r does not change after each incremental movement implies that robot 18 remains substantially on the arc path 762, ensuring that the robot is in the desired orientation to the charging station upon the approach to mating pose 602.

To ensure that radius r does not change, and observing that:

$$\theta'_R = \frac{x'_R}{r} \qquad (7)$$

where x'$_R$ is the instantaneous linear velocity of the robot and $\theta'_R$ is its instantaneous angular velocity, for a given radius r, the instantaneous linear velocity x'$_R$ may be held fixed by adjusting instantaneous angular velocity $\theta'_R$, or angular velocity $\theta'_R$ may be held fixed by adjusting linear velocity x'$_R$. Thus, by issuing a control to the robot according to:

$$\theta'_R = k\Phi \qquad (8)$$

where k is a proportional control constant, and combining the rotational controls from equations (7) and (8) above:

$$\theta'_R = \alpha(k\phi) + \beta\left(\frac{x'_R}{r}\right) \qquad (9)$$

where α and β are weighting parameters, the combined control equation (9) closes the error between the robot's actual path 772 and the desired arc path 762. In a preferred embodiment, the weighting parameters α and β may be one (1).

As robot 18 gets nearer to the charging station, the proportional control of equation (8) may be accounted for more heavily in equation (9). In another embodiment, weighting parameters α and β may be adjusted in nonlinear relation as a function of the distance to the charging station. Alternatively, the control scheme may be applied by first closing the rotational error according to equation (8) until the error gets below a threshold, then setting X'$_R$ to a fixed value, and next controlling the robot according to equation (7), constantly updating r and Φ, and then switching the control scheme back to equation (8) when the threshold is again exceeded. In this manner, the error Φ in the trajectory of the robot along arc path 762 and at final pose 602 is minimized.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto.

It should be understood that the present invention may be implemented with software and/or hardware. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." As will be appreciated by one skilled in the art, aspects of the invention may be embodied as a system, method or computer program product.

Aspects of the present invention are described with reference to flowcharts, illustrations and/or block diagrams of methods and apparatus (systems). The flowcharts and block diagrams may illustrate system architecture, functionality, or operations according to various embodiments of the invention. Each step in the flowchart may represent a module, which comprises one or more executable instructions for implementing the specified function(s). In some implementations, steps shown in succession may in fact be executed substantially concurrently. Steps may be performed by special purpose hardware-based systems that perform the specified functions or acts, or combinations of special purpose hardware and computer instructions.

Computer instructions for execution by a processor carrying out operations of the present invention may be written one or more programming languages, including object-oriented programming languages such as C#, C++, Python, or Java programming languages. Computer program instructions may be stored on a computer readable medium that can direct the robot system via the data processor to function in a particular manner, including executing instructions which implement the steps specified in a flowchart and/or system block diagram described herein. A computer readable storage medium may be any tangible medium that can contain, or store instructions for use by or in connection with the data processor. A computer readable medium may also include a propagated data signal with computer readable program code embodied therein.

The invention is therefore not limited by the above described embodiments and examples, embodiments, and applications within the scope and spirit of the invention claimed as follows.

We claim:

1. A method for navigating a robot for docking with a robot charger docking station, comprising:
    receiving an initial pose associated with a robot charger docking station;
    receiving a mating pose associated with the robot charger docking station;
    performing a first navigation of a robot from a location to the initial pose; and
    performing a second navigation of the robot from the initial pose to the mating pose,
    wherein the second navigation proceeds substantially along an arc path from the initial pose to the mating pose, thereby causing the electrical charging port of the robot to mate with an electrical charging assembly of the robot charger docking station; and
    wherein the arc path from the initial pose to the mating pose comprises a section of a unique circle having radius r and center $X_C$, $Y_C$ equidistant from the first location $X_R$, $Y_R$ associated with the initial pose and a second location $X_D$, $Y_D$ associated with the mating pose, and wherein a tangent to the unique circle at the second location $X_D$, $Y_D$ is perpendicular to the robot charger docking station;
    wherein an instantaneous linear velocity $x'_R$ and an instantaneous angular velocity $\theta'_R$ of the robot, at a pose along the arc path, are maintained in substantially constant relation with radius r:

$$\theta'_R = \frac{x'_R}{r} \quad (7)$$

and wherein controlling a rotational error of the robot comprises issuing a proportional control according to:

$$\theta'_R = k\Phi \quad (8)$$

where k is a proportional control constant and $\Phi$ is a rotational error, and/or a weighted control according to $$\theta'_R = \alpha(k\phi) + \beta\left(\frac{x'_R}{r}\right) \quad (9)$$

where $\alpha$ and $\beta$ are weighting parameters.

2. The method of claim 1, wherein the weighting parameters $\alpha$ and $\beta$ may be adjusted in nonlinear relation as a function of the distance to the charging station.

3. The method of claim 1, wherein controlling the robot comprises:
    closing the rotational error according to equation (8) until the error gets below a threshold;
    setting linear velocity $x'_R$ to a fixed value; and
    controlling the robot according to equation (7) constantly updating radius r and rotational error $\Phi$;
    wherein when the threshold is exceeded, switching the control to equation (8) until the error returns to below the threshold.

4. A mobile robot configured to navigate from a location to and dock with a robot charger docking station for re-charging, the robot comprising:
    a wheeled mobile base having an electrical charging port and a processor, wherein the processor is configured to:
        obtain an initial pose associated with the robot charger docking station;
        obtain a mating pose associated with the robot charger docking station;
        navigate the wheeled mobile base from the location to the initial pose;
        navigate the wheeled mobile base from the initial pose to the mating pose, wherein the wheeled mobile base proceeds substantially along an arc path from the initial pose to the mating pose, thereby causing the electrical charging port of the wheeled base to mate with an electrical charging assembly of the robot charger docking station; and
    wherein the arc path from the initial pose to the mating pose comprises a section of a unique circle having radius r and center $X_C$, $Y_C$ equidistant from the first location $X_R$, $Y_R$ associated with the initial pose and a second location $X_D$, $Y_D$ associated with the mating pose, and wherein a tangent to the unique circle at the second location $X_D$, $Y_D$ is perpendicular to the robot charger docking station;

wherein an instantaneous linear velocity $x'_R$ and an instantaneous angular velocity $\theta'_R$ of the robot, at a pose along the arc path, are maintained in substantially constant relation with radius r:

$$\theta'_R = \frac{x'_R}{r} \qquad (7)$$

and wherein controlling a rotational error of the robot comprises issuing a proportional control according to:

$$\theta'_R = k\Phi \qquad (8)$$

where k is a proportional control constant and $\Phi$ is a rotational error, and/or a weighted control according to $$\theta'_R = \alpha(k\phi) + \beta\left(\frac{x'_R}{r}\right) \qquad (9)$$

where $\alpha$ and $\beta$ are weighting parameters.

5. The mobile robot of claim 4, wherein the weighting parameters $\alpha$ and $\beta$ may be adjusted in nonlinear relation as a function of the distance to the robot charger docking station.

6. The mobile robot of claim 4, wherein controlling the robot comprises:
   closing the rotational error according to equation (8) until the error gets below a threshold;
   setting linear velocity $x'_R$ to a fixed value; and
   controlling the robot according to equation (7) constantly updating radius r and rotational error $\Phi$;
   wherein when the threshold is exceeded, switching the control to equation (8) until the error returns to below the threshold.

7. A non-transitory computer readable medium having stored thereon instructions, which, when executed by a processor of a robot, cause the robot to execute the steps comprising:
   receiving an initial pose associated with a robot charger docking station;
   receiving a mating pose associated with the robot charger docking station;
   controlling a first navigation of a robot from a location to the initial pose; and
   controlling a second navigation of the robot from the initial pose to the mating pose, wherein the second navigation proceeds substantially along an arc path from the initial pose to the mating pose. thereby causing the electrical charging port of the robot to mate with an electrical charging assembly of the robot charger docking station; and wherein the arc path from the initial pose to the mating pose comprises a section of a unique circle having radius r and center $X_C$, $Y_C$ equidistant from the first location $X_R$, $Y_R$ associated with the initial pose and a second location $X_D$, $Y_D$ associated with the mating pose, and wherein a tangent to the unique circle at the second location $X_D$, $Y_D$ is perpendicular to the robot charger docking station;

wherein an instantaneous linear velocity $X'_R$ and an instantaneous angular velocity $\Theta'_R$ of the robot, at a pose along the arc path, are maintained in substantially constant relation with radius r:

$$\theta = \frac{x'_R}{r} \qquad (7)$$

and wherein controlling a rotational error of the robot comprises issuing a proportional control according to:

$$\theta'_R = k\Phi \qquad (8)$$

where k is a proportional control constant and $\Phi$ is a rotational error, and/or a weighted control according to $$\theta'_R = \alpha(k\phi) + \beta\left(\frac{x'_R}{r}\right) \qquad (9)$$

where $\alpha$ and $\beta$ are weighting parameters.

8. The computer readable medium of claim 7, wherein the weighting parameters $\alpha$ and $\beta$ may be adjusted in nonlinear relation as a function of the distance to the robot charger docking station.

9. The computer readable medium of claim 7, wherein controlling the robot comprises:
   closing the rotational error according to equation (8) until the error is below a threshold;
   setting linear velocity $x'_R$ to a fixed value; and
   controlling the robot according to equation (7) constantly updating radius r and rotational error $\Phi$;
   wherein, when the threshold is exceeded, switching the control to equation (8) until the error returns to below the threshold.

* * * * *